(12) United States Patent
Blaugrund et al.

(10) Patent No.: US 12,260,459 B2
(45) Date of Patent: Mar. 25, 2025

(54) SYSTEMS AND METHODS FOR AN ELECTRONIC AUCTION

(71) Applicant: NYSE Group, Inc., New York, NY (US)

(72) Inventors: Michael Blaugrund, Briarcliff Manor, NY (US); Kevin Tyrrell, Brooklyn, NY (US); John Tuttle, New York, NY (US); Michael Paulyson, Cranford, NJ (US)

(73) Assignee: NYSE Group, Inc., New York, NY (US)

( * ) Notice: Subject to any disclaimer, the term of this patent is extended or adjusted under 35 U.S.C. 154(b) by 0 days.

(21) Appl. No.: 18/926,609

(22) Filed: Oct. 25, 2024

(65) Prior Publication Data

US 2025/0045827 A1      Feb. 6, 2025

Related U.S. Application Data

(63) Continuation of application No. 18/620,115, filed on Mar. 28, 2024, which is a continuation of application
(Continued)

(51) Int. Cl.
*G06Q 40/04* (2012.01)
*G06F 16/2457* (2019.01)
(Continued)

(52) U.S. Cl.
CPC ....... *G06Q 40/04* (2013.01); *G06F 16/24578* (2019.01); *G06Q 40/08* (2013.01);
(Continued)

(58) Field of Classification Search
USPC .......................................... 705/37
See application file for complete search history.

(56) References Cited

U.S. PATENT DOCUMENTS

| 7,089,208 B1* | 6/2006 | Levechin et al. | G06Q 40/00 705/39 |
| 9,747,643 B1* | 8/2017 | Givot | G06Q 40/04 |

(Continued)

OTHER PUBLICATIONS

Jannik Dreier et al., Defining Verifiability in e-AuctionProtocols, May 2013, Conference: Proceedings of the 8th Association for Computing Machinery. (Year: 2013).*
(Continued)

*Primary Examiner* — Scott C Anderson
*Assistant Examiner* — George N. Proios
(74) *Attorney, Agent, or Firm* — DLA Piper LLP (US)

(57) ABSTRACT

Verifiable order message handling for electronic auctions. Electronic order messages are received, with at least one message including an order of a predetermined type having sell order information associated with an entity having securities not previously registered for transactions. Requests for participation in an electronic auction are identified from among the messages. The requests include auction-only order information, with at least one request including the order of the predetermined type. It is determined whether the sell order information in the order of the predetermined type meets a predetermined auction condition based on an auction price. When the sell order information meets the predetermined auction condition, the order is permitted to participate in the electronic auction, such that the order is executed in full in the electronic auction. When the sell order information does not meet the predetermined auction condition, the electronic auction is canceled.

21 Claims, 17 Drawing Sheets

Related U.S. Application Data

No. 18/200,277, filed on May 22, 2023, now Pat. No. 11,978,120, which is a continuation of application No. 17/406,347, filed on Aug. 19, 2021, now Pat. No. 11,704,735.

(60) Provisional application No. 63/068,034, filed on Aug. 20, 2020.

(51) Int. Cl.
*G06F 40/205* (2020.01)
*G06F 40/289* (2020.01)
*G06Q 40/08* (2012.01)
*G06Q 50/26* (2024.01)

(52) U.S. Cl.
CPC .......... *G06F 40/205* (2020.01); *G06F 40/289* (2020.01); *G06Q 50/26* (2013.01)

(56) References Cited

U.S. PATENT DOCUMENTS

| | | | |
|---|---|---|---|
| 10,592,976 B1 * | 3/2020 | Givot | G06Q 30/08 |
| 10,692,144 B2 * | 6/2020 | Konduru | G06Q 40/04 |
| 2009/0313160 A1 * | 12/2009 | Kolten et al. | G06Q 40/00 705/37 |
| 2011/0016033 A1 * | 6/2011 | Wenger et al. | G06Q 40/00 705/35 |
| 2017/0103461 A1 * | 4/2017 | Acuna-Rohter et al. | G06Q 40/00 |
| 2017/0331774 A1 * | 11/2017 | Peck-Walden et al. | H04L 51/18 |

OTHER PUBLICATIONS

Jannik Dreier, et al., "*Defining Verifiability in e-Auction Protocols,*" Conference: Proceedings of he 8$^{th}$ Association for Computing Machinery SIGSAC Symposium on Information, Computer and Communications Security, May 2013, 6 pages.

* cited by examiner

| Symbol | Symbol Id | Ext. Symbol Id | XDPSYM | CTPXSYM | SIPSYM | TXN |
|---|---|---|---|---|---|---|
| △ A | 4541 | 4541 | A | A | A | txn-1 |
| △ AA | 4543 | 4543 | AA | AA | AA | txn-1 |
| △ AA.PR | 4544 | 4544 | AA.PR | AA. | AA.Q | txn-2 |
| △ AADR | 35465 | 35465 | AADR | AADR | AADR | txn-2 |
| △ AAIT | 39561 | 39561 | AAIT | AAIT | AAIT | txn-3 |
| △ AAL | 43256 | 43256 | AAL | AAL | AAL | txn-3 |
| △ AAMC | 41995 | 41995 | AAMC | AAMC | AAMC | txn-2 |
| ⟨ ⟩ ᐧ ᐧ ᐧ | ᐧ | ᐧ | ᐧ ᐧ ᐧ | ᐧ ᐧ ᐧ | ᐧ ᐧ ᐧ | ᐧ ᐧ ᐧ |

| Trade SIP | Quote SIP |
|---|---|
| m2cast_xnys.CTS-1.4-XNYS | m2cast_xnys.CQS-1.4-XNYS |
| m2cast_xnys.CTS-1.2-XNYS | m2cast_xnys.CQS-1.2-XNYS |
| m2cast_xnys.CTS-2.2-XNYS | m2cast_xnys.CQS-2.2-XNYS |
| m2cast_xnys.CTS-2.4-XNYS | m2cast_xnys.CQS-2.4-XNYS |
| m2cast_xnys.UTPBT-3.1-XNYS | m2cast_xnys.UTPBQ-3.1-XNYS |
| m2cast_xnys.UTPBT-3.1-XNYS | m2cast_xnys.UTPBQ-3.1-XNYS |
| m2cast_xnys.CTS-2.1-XNYS | m2cast_xnys.CQS-2.1-XNYS |

FIG. 8E

SYSTEMS AND METHODS FOR AN ELECTRONIC AUCTION

TECHNICAL FIELD

The present disclosure relates generally to handling electronic message data and, more particularly, to the handling and verification of electronic order messages for electronic auction processing.

BACKGROUND

Systemic problems exist in the field of electronic trading systems. For example, existing electronic trading systems very often have a technical problem of efficiently handling electronic messages requesting participation in various electronic transactions, including time-sensitive transactions related to electronic auctions. Existing electronic trading systems do not have the ability to quickly identify and verify characteristics of various types of order messages. As a result, electronic auction processes may be unnecessarily halted and/or canceled, because of the inclusion of improper (e.g., unverified) order data (e.g., order data that fails to meet predefined order type characteristics, order data with missing and/or incorrect values, order data with improper parameters for a particular matching process, etc.). Moreover, existing electronic trading systems do not have the ability to permit orders with particular characteristics to participate in an electronic auction where such orders would ordinarily be restricted from participation in the auction. As a result, the electronic auction may be deprived of order data leading to, for example, decreased liquidity, a decreased likelihood of generating matched orders and an increased likelihood of maintaining a number of unmatched orders that may need to be stored (and further processed internally and/or transmitted to one or more remote entity systems for further processing). Thus, the technical problems of electronic message handling in existing electronic trading systems leads to unnecessary additional processing (e.g., through halting/canceling/additional downstream operations, additional storage (e.g., through storing unmatched orders) and delayed matching (due to additional processing for unmatched data), collectively producing a drain on computer resources in existing electronic trading systems and leading to the possibility of inaccurate matching with stale data (e.g. due to delayed matching).

Accordingly, it would be desirable to have systems and methods for facilitating electronic order message handling for electronic auctions, in a verifiable and systematically-efficient manner.

SUMMARY

Aspects of the present disclosure relate to systems, methods and non-transitory computer-readable mediums providing verifiable order message handling for electronic auctions. A system includes one or more entity systems and a computer platform including at least one processor and non-transitory memory. The computer platform is configured to communicate with the one or more entity systems via one or more computer networks. The computer platform is configured to receive one or more electronic order messages from among the one or more entity systems. At least one message among the one or more electronic order messages includes an order of a predetermined order type including sell order information associated with an entity having securities not previously registered for transactions with the computer platform. The computer platform is further configured to identify, from among the one or more electronic order messages, one or more requests for participation in an electronic auction associated with the computer platform. The one or more requests includes auction-only order information. At least one request among the one or more requests includes the order of the predetermined order type. The computer platform is further configured to determine an auction price for the electronic auction, and determine whether the sell order information in the order of the predetermined order type meets at least one predetermined auction condition based on the auction price. When the sell order information meets the at least one predetermined auction condition, the order is permitted to participate in the electronic auction, such that the order is executed in full in the electronic auction via an auction engine of the computer platform. When the sell order information does not meet the at least one predetermined auction condition, the electronic auction is canceled.

BRIEF DESCRIPTION OF THE DRAWINGS

FIGS. 8A, 8B, 8C, 8D and 8E are screenshots of an example administrator GUI according to an aspect of the present disclosure.

DETAILED DESCRIPTION

Figure 1:
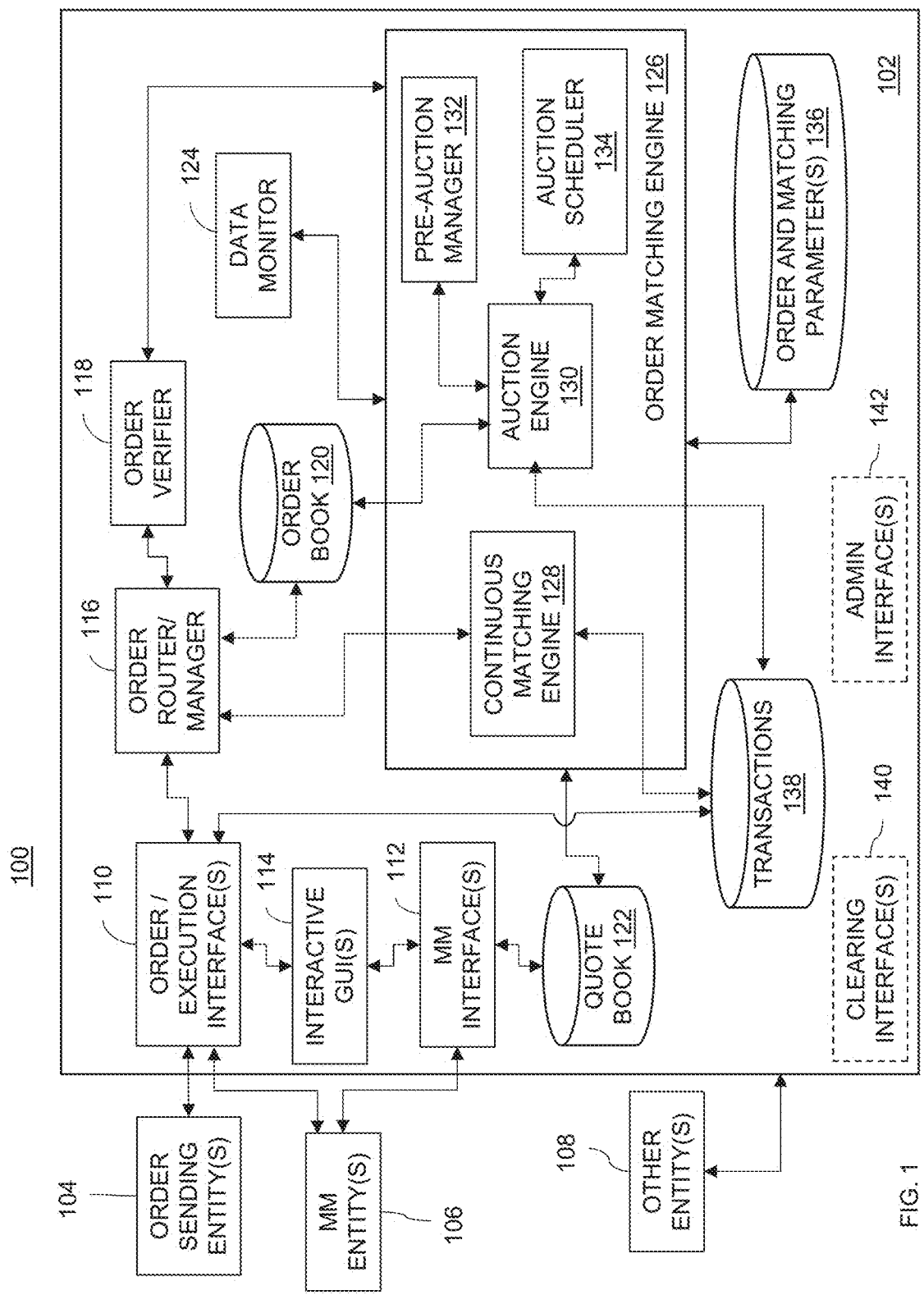
FIG. 1 is a functional block diagram of an example electronic trading system for verifiable electronic order message handling, according to an aspect of the present disclosure.

The present disclosure relates generally to system components, processes and computer programs for verifiable order message handling for electronic auctions associated with an electronic trading system. An electronic trading system of the present disclosure may include one or more order sending entity systems and a computer platform configured to communicate with the order sending entity system(s) via one or more computer networks. The computer platform may receive one or more electronic order messages from among the entity system(s), where at least one message among the electronic order message(s) is an order of a predetermined order type (e.g., an issuer direct offering (IDO) order) that is eligible to participate in an electronic auction when one or more predetermined auction conditions are met. The predetermined order type may relate to sell order information associated with an entity having securities not previously registered for trading (e.g., transactions) on the electronic trading system represented by the computer platform (an example of an electronic exchange system), but which securities may be in the process of being registered with an appropriate regulatory authority (e.g., via a registration statement). The platform may also identify, from among the electronic order messages, one or more requests for participation in an electronic auction associated with the computer platform (e.g., an electronic exchange system), where the request(s) may include auction-only order information. At least one of the requests may include the order of the predetermined order type. The platform may also be configured to determine an auction price for the electronic auction, and determine whether the sell order information in the order of the predetermined order type meets at least one predetermined auction condition based on the auction price. When the sell order information meets the predetermined auction condition(s), the order is permitted to participate in the electronic auction, such that the order is executed in full in the electronic auction via an auction engine of the computer platform. When the sell order information does not meet the predetermined auction condition(s), the electronic auction may not be permitted to proceed and the order is canceled from participation in the electronic auction.

In some embodiments, aspects of the present disclosure are directed to the creation and handling of a new electronic order type (including a predetermined format in an electronic message) that may permit particular entities (e.g., entities that have securities not previously registered for trading on an electronic exchange system (e.g., a computer platform) to participate in an electronic auction, under predefined conditions, where participation by such entities is not permitted by existing systems (i.e., under any conditions)). Importantly, the present disclosure creates a mechanism (through the newly created particular order message) for such entities to participate (under verifiable conditions as determined by the platform itself). The verifiable conditions allow the platform to ensure that participation by such entities in an electronic auction may not cause the auction to be halted and/or canceled.

In some examples, the entity may have securities not previously registered for trading on an electronic exchange system (which may be represented by the computer platform of the present disclosure), but which securities may be in the process of being registered with an appropriate regulatory (e.g., governmental) authority, such as in a registration statement to be filed with the appropriate authority. In some examples, an IDO order may represent a limit order to sell that may be entered on behalf of an issuer that is offering new shares by selling those shares in an electronic auction for at least one primary direct listing security (e.g., to raise capital). The platform of the present disclosure may perform a number of verifications, both the order characteristics included in the IDO order message, as well as the entity sending the IDO order message. If the (incoming) IDO order message does not meet these verification(s), the order may be rejected. In some examples, the verifications may include one or more of the following, that: the order may only be sent from a designated broker dealer entity that is registered with the platform (e.g., the electronic exchange system), the order is for a limit on open, the order is a sell-only order, the order is priced at (or in some examples towards) a lower end of a filed price range (in the registration statement), and the order is sized and/or valued as indicated in the registration statement. As part of the order message handling, the platform of the present disclosure may control the processing of IDO orders such that the order may not be permitted to be subject to a cancel action or a cancel and replace action and that the IDO order may be included in any imbalance determinations for an electronic auction. Yet further, the order handling may include verifications in order to participate in an electronic auction, including that the auction price is within the filed price range of the IDO order (in the registration statement), that an IDO order is present in the electronic auction, and that the price of the auction should fully execute the IDO order. In some examples, the auction may be hard blocked if these verifications may not be confirmed. In some examples, the electronic auction may include an opening auction for one or more primary direct listing securities.

Aspects of the present disclosure, in some examples, relate to a technique for enabling an entity that is not previously registered for trading with an electronic exchange system, but has obtained regulatory approval (such as a registration statement) from a regulatory authority, to provide its shares (of securities) to the electronic exchange system the very first time the entity issues its shares, via an exchange-executed electronic auction. In the present disclosure, the electronic exchange system, subject to the entity obtaining regulatory approval, may be configured to facilitate a primary offering that does not involve an underwriter (where typically the exchange facilitates a secondary offering that involves an underwriter). In some examples, this technique provides entities the ability to have a public trading of securities (e.g., the ability for public trading and offering of securities directly on the electronic exchange). In other words, a conventional process for entities that are not previously registered for trading is through a secondary offering performed via an underwriter. In contrast, the approach of the present disclosure allows entities to offer securities directly through the electronic exchange publicly (i.e., as a primary offering). In the technique of the present invention, an entity may obtain regulatory approval (e.g., via a registration statement in the US). Once the regulatory approval is obtained, the technique of the present disclosure provides the ability to offer the securities directly on the electronic exchange system, which is defined as a direct listing.

Referring now to FIG. 1, a functional block diagram of example electronic trading system 100 (system 100 herein) for verifiable electronic order message handling is shown. System 100 may include posting market platform 102 (platform 102 herein), one or more order sending entities 104, one or more market maker (MM) entities 106 and, in some examples, one or more other entities 108. In some examples, platform 102 may represent an electronic exchange system. Although not shown, platform 102, order sending entity(s) 104, MM entity(s) 106 and other entity(s) 108 may be communicatively coupled via one or more communication (e.g., wired and/or wireless) networks. The one or more networks may include, for example, a private network (e.g., a local area network (LAN), a wide area network (WAN), intranet, etc.) and/or a public network (e.g., the Internet).

Order sending entity(s) 104 may be configured to post one or more orders on platform 102 from one or more market participants (e.g., traders). Order sending entity(s) 104 may be configured to post orders associated with one or more traders via one or more electronic order messages (i.e., electronic messages indicating an order) and to receive communications regarding orders (e.g., cancellations, executions, etc.) from platform 102. An electronic order message may include one or more order characteristics such as, without being limited to, one or more securities associated with the order, an order type, whether the order is for a buy or sell, one or more entity characteristics of the trader, an amount for the order, and the like. In some examples, order sending entity(s) 104 may include at least one broker dealer. Order sending entity(s) 104 may comprise a server computer, a desktop computer, a laptop, a smartphone, a tablet or any other suitable computing device configured to capture, receive, store and/or disseminate any suitable data. In some examples, order sending entity(s) 104 may communicate with one or more market participant devices (associated with market participant(s). In some examples, market participant device(s) may comprise a server computer, a desktop computer, a laptop, a smartphone, tablet, or any other suitable computing device known in the art configured to capture, receive, store and/or disseminate any suitable data.

In some examples, order sending entity(s) 104 (and/or market participant device(s)) may include a computing device comprising a display device, a user interface and a communication interface for communication with interactive GUI(s) 114. The user interface and the display may be one component (e.g., a touchscreen display), may be separate components (e.g., a display and a pointing device) and or any combination thereof. In some examples, order sending entity(s) 104 may include a client application for communication, such as a client application for communicating with interactive GUI(s) 114.

In general, MM entity(s) 106 may be configured to maintain two-sided quotes in accordance with one or more predetermined business rules of platform 102. In one non-limiting example, MM entity(s) 106 may include at least one designated MM (DMM). DMM(s) may be configured to maintain fair and orderly markets for one or more assigned securities. In some examples, DMM(s) may be configured to facilitate price discovery during market opens, closes and during periods of trading imbalances or instability. Interaction with DMM(s) may improve pricing, reduce volatility and add liquidity to orders being matched on platform 102. In some examples, DMM(s) may be configured to manage one or more auctions (e.g., via physical interaction and/or for a completely automated auction (e.g., via algorithm quotes from DMM(s) and/or other market participants). MM entity(s) 106 may comprise a server computer, a desktop computer, a laptop, a smartphone, a tablet or any suitable other computing device configured to capture, receive, store and/or disseminate any suitable data.

In some examples, MM entity(s) 106 may include a computing device comprising a display device, a user interface and a communication interface for communication with interactive GUI(s) 114. The user interface and the display may be one component (e.g., a touchscreen display), may be separate components (e.g., a display and a pointing device) and or any combination thereof. In some examples, MM entity(s) 106 may include a client application for communication, such as a client application for communicating with interactive GUI(s) 114.

Other entity(s) 108 may include, without being limited to, one or more away market systems, one or more distribution platforms, and/or any other suitable remote entity that may desire to interact with platform 102. Other entity(s) 108 may comprise a server computer, a desktop computer, a laptop, a smartphone, tablet, or any other suitable computing device known in the art configured to capture, receive, store and/or disseminate any suitable data. In some examples, other entity(s) 108 may include a computing device comprising a display device, a user interface and a communication interface for communication with interactive GUI(s) 114. The user interface and the display may be one component (e.g., a touchscreen display), may be separate components (e.g., a display and a pointing device) and or any combination thereof. In some examples, other entity(s) 108 may include a client application for communication, such as a client application for communicating with interactive GUI(s) 114.

Platform 102 may include one or more order/execution interfaces 110, one or more MM interfaces 112, one or more interactive GUIs 114, order router/manager 116, order verifier 118, order book storage structure 120, quote book storage structure 122, data monitor 124, order matching engine 126, order and parameter storage 136 and transaction storage structure 138. In some examples, platform 102 may include one or more of at least one optional clearing interface 140 and at least one administrator (admin) interface 142.

Although not shown, platform 102 may include at least one processor (e.g., processing device 602 shown in FIG. 6) and non-transitory memory (e.g., memory 606 shown in FIG. 6) storing one or more routines and or algorithms for performing the functions of platform 102 described herein. An example implementation of one or more components of platform 102 is shown by computer system 600 (shown in FIG. 6).

In some examples, components 110-142 of platform 102 may be embodied on a single computing device. In other examples, components 110-142 of platform 102 may be embodied on two or more computing devices distributed over several physical locations, connected by one or more wired and/or wireless links. It should be understood that platform 102 refers to a computing system having sufficient processing and memory capabilities to perform the specialized functions described herein.

In some examples, one or more of order sending entity(s) 104, MM entity(s) 106 and other entity(s) 108 may be configured to communicate with platform 102 via one or more data feed interfaces (e.g., order/execution interface(s) 110, MM interface(s) 112). The data feed interface(s) may be specially configured as real-time connection(s). Thus, in operation, electronic messages may be transmitted to platform 102 via the real-time data feed interface(s). In some examples, the data feed may include secure (e.g., encrypted) data feeds.

In summary, platform 102 may be configured to interact with order sending entity(s) 104, MM entity(s) 106 and other entity(s) 108, for example, through one or more electronic communications such as electronic messages, interactive graphical user interface(s) (GUIs), such as interactive GUI(s) 114), mobile application(s), etc. For example, platform 102 may receive order and/or quote indications via electronic messages from among respective order sending entity(s) 104 and/or MM entity(s) 106. Platform 102 may be configured to parse received electronic messages, perform verification of one or more message characteristics (e.g., header information, sender information, data in the message itself) of the parsed messages and may route verified messages to at least one particular destination based on the message characteristics (e.g., to order book storage 120, to continuous matching engine 128, to auction engine 130, to other entity(s) 108).

Platform 102 may also be configured to generate and send one or more electronic messages and/or electronic indications (such as via interactive GUI(s) 114) to one or more of order sending entity(s) 104, MM entity(s) 106 and other entity(s) 108. For example, platform 102 may send order rejection messages based on any errors identified during verification of message characteristics, order cancellation messages based on operation(s) of order matching engine 126, auction advertisement messages for one or more upcoming auctions (performed by auction engine 130), auction cancellation/halt messages for an auction, transaction indication messages based on operation(s) of order matching engine 126, order routing messages to other entity(s) 108, publication information associated with operations of order matching engine 126 (e.g., to one or more distribution platforms among other entity(s) 108) and the like.

Yet further, platform 102 may be configured to perform one or more order matching operations via order matching engine 126 to generate one or more transactions. In general, platform 102 may be configured to perform continuous order matching (via continuous matching engine 128) and order matching via one or more auctions (e.g., opening auctions, intra-day auctions, etc., via auction engine 130). In some examples, the auction may include an opening auction including a direct listing auction.

In some examples, platform 102 may be configured to permit a predetermined order type (referred to herein as an issuer direct offering (IDO) order) having specific entity characteristics (i.e., an entity having securities not previously registered for transactions (e.g., trading) with platform 102) and specific order characteristics (i.e., a sell limit order with sell order information that meets one or more predetermined auction conditions) to participate in the direct listing opening auction. In a non-limiting example, the securities that have not been previously registered may include cash equity securities. In general, embodiments of the present invention could be used with any suitable type of security, including, without being limited to, one or more of cash equities, futures, options, derivatives, fixed income (e.g., bonds) and debt.

Platform 102 may be configured to verify the message characteristics of incoming IDO order messages (e.g., for entity and auction condition characteristic(s)) in order to permit the IDO order to participate in the opening auction. Importantly, an IDO order message may be configured to include particular elements (e.g., flag(s), values and/or other indicators in the header and/or message body) that permit platform 102 to verify not only the inclusion of these elements but also that these elements match predefined entity characteristic(s) and predetermined auction condition(s)). Because platform 102 is able to verify these particular characteristics/conditions, platform 102 may permit orders for entities with previously unregistered securities to participate in the direct listing opening auction, under particular circumstances.

Importantly, existing systems lack the specific electronic message configuration, order type detection and verification mechanisms of the present disclosure. Thus, conventional systems simply do not permit entities with previously unregistered securities from participation in a direct listing opening auction. In contrast, the architecture of platform 102 itself, in combination with a new type of order message having a specific configuration permits platform 102 to verify particular entity characteristics and permit the IDO order to participate in the auction, under predetermined auction conditions. Accordingly, platform 102 provides the ability to permit orders with particular characteristics (e.g., IDO orders) to participate in an electronic opening auction, where orders from such entity(s) would ordinarily be excluded (e.g., restricted) from participation in the electronic auction. In this manner, system 100 of the present disclosure may increase the liquidity for the auction (e.g., by increasing the number of orders to be potentially matched), may increase the likelihood of generating matched orders and may decrease the likelihood of storing a number of unmatched orders responsive to the auction (thereby decreasing the number of unmatched orders that may need to be stored and further processed either internally or externally). Thus, platform 102 provides improved electronic message handling, improved auction process handling and improved overall efficiency of computer resources of platform 102.

The solutions described herein utilize the power, speed and precision of a special purpose computer system configured precisely to execute the complex and computer-centric functions described herein. As a result, a mere generic computer will not suffice to carry out the features and functions described herein. Further, it is noted that the systems and methods described herein solve computer-centric problems specifically arising in the realm of computer networks so as to provide an improvement in the functioning of a computer, computer system and/or computer network, including the electronic message handling described herein.

Order/execution interface(s) 110 may be configured to interact with order sending entity(s) 104, MM entity(s) 106, other entity(s) 108 (e.g., away market entity(s), distribution platforms, etc.) and order matching engine 126 (e.g., in an order execution process). In some examples, order/execution interface(s) 110 may include an electronic device including hardware circuitry and/or an application on an electronic device. In some examples, order/execution interface(s) 110 may include at least one data feed interface, including, in some embodiments, security protection.

MM interface(s) 112 may be configured to interact with MM entity(s) 106 to capture market maker indications (e.g., bids and offers in assigned issues). The bids and offers may be configured to be stored in quote storage structure 122. In some examples, MM interface(s) 112 may include an electronic device including hardware circuitry and/or an application on an electronic device. In some examples, MM interface(s) 112 may include at least one data feed interface, including, in some embodiments, security protection.

Although not shown, in some examples, platform 102 may include one or more further interfaces (e.g., an electronic device including hardware circuitry, an application on an electronic device) configured for interaction with other entity(s) 108. For example, platform 102 may include a separate interface for interaction with away market entity(s) to capture quote and last sale information, which information may be stored in a storage structure (not shown). The away market quote and last sale information may be used to determine a market best bid and offer.

Interactive GUI(s) 114 may be configured to present one or more user input tools, one or more display tools (and in some examples one or more analysis tools) for interacting with platform 102 (e.g. with order and/or quote data associated with platform 102), including in real-time and/or near real-time. For example, platform 102 may generate an interactive GUI for presentation on order sending entity(s) 104 via order/execution interface(s) 110, for interacting with order data (e.g., to view orders submitted to platform, to view executed orders executed via order matching engine 126, to modify and/or cancel existing orders submitted to platform 102, to receive and/or interact with alert, status and/or error messages associated with one or more orders and the like).

In one non-limiting example, platform 102 may be further configured to generate an administrator-specific interactive GUI for presentation of user interaction tool(s), display tool(s) and analysis tools, for interaction by at least one administrator (not shown) with various aspects of platform 102 in real-time and/or near real-time (e.g., via optional administrator interface(s) 142). In some examples, an administrator-specific interactive GUI may permit an administrator interact with auction(s) (via communication with auction engine 130), to interact with pre-auction procedures (e.g., via pre-auction manager 132) and to analyze data (such as order data, quote data, away market data, transaction imbalance data and the like).

In another non-limiting example, platform 102 may be further configured to generate a DMM-specific interactive GUI for presentation of user interaction tool(s), display tool(s) and analysis tools on at least one of MM entity(s) 106 via MM interface(s) 112, for interaction with various aspects of platform 102 in real-time and/or near real-time. The DMM-specific interactive GUI may permit DMM(s), for example, to view (and in some examples interact with) order data, to view and/or interact with quote data, to interact with auction(s) (via communication with auction engine 130), to interact with pre-auction procedures (e.g., via pre-auction manager 132) and to analyze data (such as order data, quote data, away market data, transaction imbalance data and the like) to interact with order matching engine 126 (e.g., to facilitate price discovery during various periods such as market opening and/or closing periods, transaction imbalance periods, instability periods, etc.).

In general, platform 102 may provide one or more operational tools for interaction with various aspects of platform, including in real-time and/or near real-time, by one or more authorized users (e.g., an administrator, a DMM and the like). The operational tool(s) may include, without being limited to, one or more of an interactive GUI, a command line interface and the like.

Order router/manager 116 may be configured to receive electronic order messages (including for IDO order(s)), determine order characteristics of the received messages (e.g., order type, sender, etc.). Order router/manager 116 may also be configured to verify one or more characteristics of the orders, via communication with order verifier 118. In some examples, order router/manager 116 may be configured determine whether entity characteristics (for a sender) match predefined entity characteristics for on indicated IDO order message. In some examples, order router/manager 116 may also analyze message characteristics, such as to insure that an indicated order message is not missing any information, is a valid order message and the like. Order router/manager 116 may be further configured to generate one or more messages to one or more entities (e.g., order sending entity(s) 104) such as when an order message is rejected. Order router/manager 116 may be further configured to route verified order message(s) to a destination (e.g., order book storage structure 120, continuous matching engine 128, other entity(s) 108), based on the order characteristics. An example of order router/manager 116 is described further below with respect to FIG. 2.

Order verifier 118 may be configured to verify one or more characteristics of order messages (including for IDO order(s)). In some examples, order verifier 118 may verify one or more entity characteristics indicated in an order message. In some examples, order verifier 118 may perform one or more risk checks on order messages. In some examples, order verifier 118 may communicate with order router/manager 116 and auction engine 130. In some examples order verifier 118 may interact with auction engine 130 to verify order characteristics, for example, as part of an auction allocation process. An example of order verifier 118 is described further below with respect to FIG. 2.

Order book storage structure 120 may be configured to store one or more orders (e.g., buy and sell orders, including IDO order(s)) received from among order sending entity(s) 104. Storage structure 120 may include any suitable storage structure (e.g., order allocation data structure 228 shown in FIG. 2) suitable for storing and retrieving order data in a computationally efficient and timely manner.

Quote book storage structure 122 may be configured to store one or more quotes (e.g., bids and offers) received from among MM entity(s) 106. Storage structure 122 may include any suitable storage structure, including any time and/or priority data structures suitable for storing and retrieving quote data in a computationally efficient and timely manner.

Data monitor 124 may be configured to continually monitor data (e.g., in real-time and/or near real-time), from one or more data sources that may be useful for performing one or more order matching operations by order matching engine 126. In some examples, data monitor 124 may monitor data from among other entity(s) 108, such as quote and last sale information from one or more away market entities, which may be useful for determining an up-to-date market best bid and offer.

Storage structure 136 may be configured to store one or more pre-defined order and order matching parameters and rules that may be used by order matching engine 126 in matching orders and executing transactions. Storage structure 136 may include any suitable storage structure, including at least one data structure suitable for storing and retrieving order and matching parameter(s)/rule(s) in a computationally efficient and timely manner.

Transaction storage structure 138 may be configured to store one or more transactions (e.g., trades) received from order matching engine 126 (e.g., responsive to one or more order matching processes among continuous matching engine 128 and auction engine 130). Storage structure 138 may include any suitable storage structure, including at least one data structure suitable for storing and retrieving transaction data in a computationally efficient and timely manner.

Optional clearing interface(s) 140 may be configured to interact with one or more clearing and settlement entities (e.g., an example of other entity(s) 108) for providing clearing and settlement services for securities transactions generated by platform 102. In some examples, optional clearing interface(s) 140 may include an electronic device including hardware circuitry and/or an application on an electronic device. In some examples, optional clearing interface(s) 140 may include at least one data feed interface, including, in some embodiments, security protection.

Optional administrator interface(s) 142 may be configured to interact with one or more administrators (not shown) for interaction with various aspects of platform 102 in real-time and/or near real-time. In some examples, optional administrator interface(s) 142 may include an electronic device including hardware circuitry and/or an application on an electronic device. In some examples, optional administrator interface(s) 142 may include at least one data feed interface, including, in some embodiments, security protection.

Order matching engine 126 may include continuous matching engine 128, auction engine 130, pre-auction manager 132 and auction scheduler 134. In general, order matching engine 126 may be configured to validate, match and process all orders and quotes on platform 102. In some examples, order matching engine may 128 route orders to other entity(s) 108 (e.g., an away market entity) under one or more predefined conditions.

Continuous matching engine 128 may be configured to immediately execute incoming marketable orders (that meet particular order characteristics) against orders in order book storage structure 120 in a continuous matching process. Any matched orders may form transactions that may be stored in transaction storage structure 138.

Auction engine 130 may be configured to perform one or more auction processes during one or more designated auction periods. In general, order matching engine 126 may activate auction engine 130 at an onset of an auction period (e.g., via one or more indications from auction scheduler 134). Auction engine 130 may initiate an order auction process, which may include queuing orders (including orders among those stored in order book storage structure 120) that are eligible to participate in the scheduled auction. Auction engine 130 may also verify that orders are indeed eligible for participation. Auction engine 130 may then perform an order matching process for the designated auction period, subject to any predefined auction conditions, and based on a reference price determined for the auction as well as any order imbalances. Matched auction orders may be executed, and resulting transactions may be stored in transaction storage structure 138. In some examples, any remaining unmatched orders at the end of the auction may be released to continuous matching engine 128 for execution against its orders in order book storage structure 120. In some examples, auction engine 130 may be configured to perform an opening auction process for direct limit orders including at least one IDO order. In some examples, the electronic auction process may be performed completely electronically by an electronic decision maker (i.e., without any user input). In some examples, one or more auctions may include interaction with one or more DMMs among MM entity(s) 106 (e.g., via interactive GUI(s) 114). In some examples, the continuous matching process and order auction process(s) may execute concurrently, but are logically separate processes. An example of auction engine 130 is described further below with respect to FIG. 3.

Pre-auction manager 132 may be configured to perform one or more pre-auction routines (e.g., via rules stored in storage structure 136) during at least one pre-auction period. For example, the upcoming auction may be broadcast in the marketplace (e.g., to order sending entity(s) 104, other entity(s) 108). The broadcasts may include one or more pre-opening indications. In some examples, the pre-opening indication(s) may indicate at least one security to be included in the auction and a price range within which an auction price is anticipated to occur, without publicly disclosing details of orders that may be eligible for the auction. In some examples, the pre-opening indication(s) may provide information that may be related to an indication reference price for a security (e.g., information related to a security's last official closing price, a security's offering price, a security's last reported sale price on a securities market, a security's most recent transaction price, a lowest price of an auction price range, etc.). In some examples, as new orders are received by platform 102 and existing orders may be canceled and/or modified during the pre-auction period, pre-auction manager 132, via auction engine 130, may continuously calculate and disseminate an updated auction imbalance indication.

Auction scheduler 134 may be configured to store information related to one or more auction periods (e.g., an opening auction period, a closing auction period, at least one intra-day auction period, etc.). In some examples, auction scheduler 134 may also be configured to store information relating to one or more pre-auction periods. In some examples, auction scheduler 134 may prompt initiation and/or termination of one or more of pre-auction process(s) by pre-auction manager 132 and auction process(s) by auction engine 130 based on the stored pre-auction/auction period information.

Although embodiments of the present disclosure describe auctions in the context of an opening auction, it is understood that auctions of present disclosure could also be scheduled at different times during the trading day (including, in some examples, a closing auction). Although embodiments of the present disclosure describes auctions specific to direct listing auctions, it is understood that the present disclosure is not limited to direct listing auctions, and that embodiments of the present disclosure could be used in any type of financial instrument market center environment (e.g., cash equities, futures, options, derivatives, fixed income (e.g., bonds), debt, etc.).

It is understood that system 100 represents an exemplary embodiment of the present disclosure and that system 100 may be configured with more or fewer components than shown, may combine two or more components, or may have a different configuration or arrangement of the components. For example, although continuous matching engine 128 and auction engine 130 are illustrated as separate components, in some examples, continuous matching engine 128 and auction engine 130 may be combined into one component.

Figure 2:
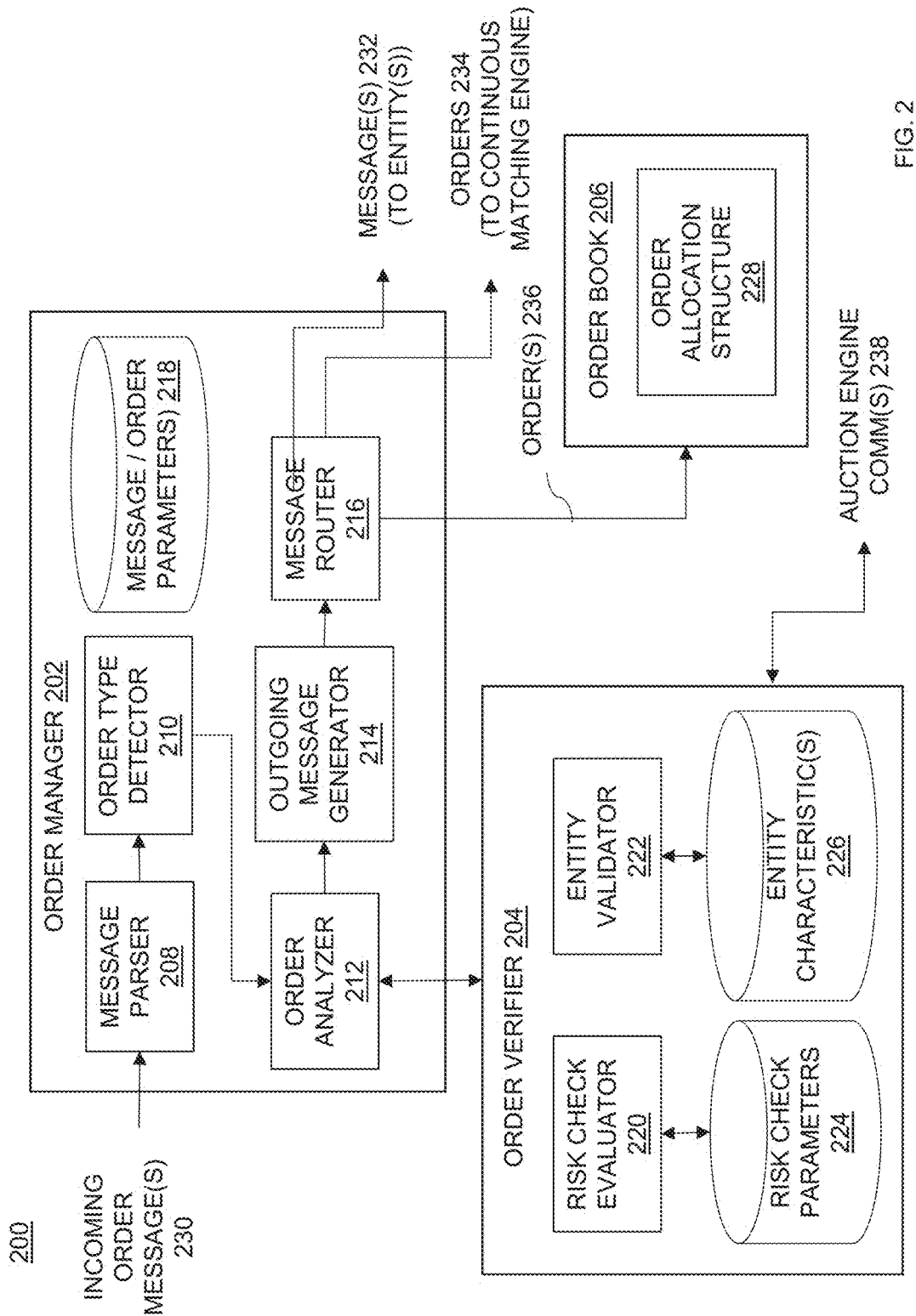
FIG. 2 is a functional block diagram of an example verifiable order message handling system, according to an aspect of the present disclosure.

Referring now to FIG. 2, a functional block diagram of example verifiable order message handling system 200 is shown, according to an aspect of the present disclosure. Verifiable order message handling system 200 (also referred to herein as system 200) may include order manager 202 and order verifier 204. In some examples, order manager 202 represents an example of order router/manager 116 and order verifier 204 represents an example of order verifier 118 (shown in FIG. 1). For completeness, system 200 is shown in communication with order book storage 206.

Order manager 202 may include message parser 208, order type detector 210, message/order parameter(s) storage structure 218, order analyzer 212, outgoing message generator 214 and message router 216. In summary, order manager 202 may be configured to receive one or more incoming electronic order messages 230 (including messages indicating IDO order(s)), may analyze and verify characteristic(s) of messages 230, may generate one or more outgoing messages (in some examples) and may route verified messages (in some examples) to at least one destination.

Message parser 208 may be configured to parse incoming electronic order message(s) 230 (e.g., received via order/execution interface(s) 110 of FIG. 1). In general, an order message 230 may include a message header having a predetermined format and a message body. Message parser 208 may parse each order message 230 to identify and extract one or more predetermined elements in the message header (e.g., an element in a predetermined position, a flag set in in a predetermined position and the like) associated with message characteristic(s). In some examples, message parser 208 may parse information in the message body to extract one or more message characteristics (e.g., an order amount, a buy or sell indication, other conditions). For example, message parser may identify and extract keywords (e.g., "buy", "sell", etc.), predetermined phrases, etc. in the message body, via one or more text-parsing algorithms (e.g., keyword matching, natural language processing based on one or more rules, and the like). The extracted elements (e.g., message characteristic(s)) in the header and/or message body from an order message 230 may be provided to order type detector 210.

Order type detector 210 may be configured to determine an order type (e.g., IDO order, limit on open (LOO) order limit order, market order, etc.), indicated in each order message 230, based on the extracted elements received from message parser 208. In some examples, order type detector 210 may determine the order type by comparing one or more of the extracted elements to predetermined order type parameters stored in storage structure 218. For example, a direct listing order type may be indicated by a direct listing flag. As another example, an IDO order type may be indicated based on inclusion of a predefined value in a particular header element. Order type detector may provide the identified order type and the extracted elements (e.g., message characteristic(s)) to order analyzer 212.

Order analyzer 212 may be configured to analyze the message characteristics for an order message 230 to determine whether it meets one or more predetermined conditions specific to the identified order type. For example, order analyzer 212 may compare one or more of the extracted elements to one or more predefined order type characteristics stored in storage structure 218, to confirm (for example) that the order type is not missing any of one or more predefined order type characteristics, that information in the extracted elements (e.g., a buy amount for a security, a sell amount for a security, a security indicated in the order, an order action (e.g., create, modify, cancel), etc.) match predetermined order type conditions (e.g., a permissible range of an amount, a permissible buy, a permissible sell, a permissible security, and the like). In general, order analyzer may determine whether any suitable characteristic indicated in the extracted element(s) meets a suitable predefined order type characteristic to confirm that the order is indeed a valid (permissible) order type.

Order analyzer 212 may also be configured to verify one or more characteristics of order message 230, via communication with order verifier 204. Order verifier 204 may include risk check evaluator 220, entity validator 222, risk check parameter storage structure 224 and entity characteristic storage structure 226. In summary, order verifier 204 may perform one or more of risk checks and sender validation of the message characteristic(s). Order verifier 204 may communication an indication of verification (or lack of verification) to order manager 202 and/or via communication(s) 236 with an auction engine (e.g., auction engine 130 of FIG. 1). Order verifier 204 may perform at least one type of verification based on a request from order manager 202 and/or auction engine 130 (via auction engine communication(s) 238).

Referring further to order verifier 204, order verifier 204 may include risk check evaluator 220, entity validator 222, risk check parameter storage structure 224 and entity characteristic storage structure 226.

Risk check evaluator 220 may be configured to perform one or more risk checks on the message characteristic(s) based on one or more predefined risk check parameters stored in storage structure 224. In a non-limiting example, the risk checks may include one or more of a single order maximum notional value risk check, a single order maximum quantity risk check and a gross credit limit check. In some examples, the risk check(s) may be optional.

Entity validator 222 may be configured to verify one or more entity characteristics of an order message 230. In some examples, entity validator 222 may compare a market participant identifier (MPID) extracted from message 230 to one or more predefined MPIDs stored in storage structure 226. In some examples, the entity validator may be used (e.g., by order manager 202) to determine whether an IDO order type indicated in an order message 230 is sent from a designated broker dealer that is registered with platform 102, based on comparing the MPID in the order message 230 to predefined MPIDs stored in storage structure 226. In general, entity validator 222 may compare any suitable entity characteristic indicated in the order message 230 (e.g., the market participant itself, a location of the market participant, a location of the order sending entity and the like) to one or more predefined entity characteristics to validate an entity associated with the order message 230.

Storage structure 224 may be configured to store one or more risk check parameters (and in some examples one or more rules) that may be used by risk check evaluator 220 for performing one or more risk checks on order message characteristic(s). Storage structure 224 may include any suitable storage structure for storing and retrieving predefined risk check parameter(s)/rules in a computationally efficient and timely manner.

Storage structure 226 may be configured to store one or more pre-defined entity characteristic(s) (and in some examples one or more rules) that may be used by entity validator 222 for performing one or more entity validations on entity characteristics. Storage structure 226 may include any suitable storage structure for storing and retrieving predefined entity characteristic(s)/rules in a computationally efficient and timely manner.

Next, a summary of IDO order characteristics and auction conditions are described. An IDO order may be defined as a limit order to sell that is entered on behalf of an issuer that is selling shares in an opening (core) auction for a primary direct listing security (e.g., to raise capital). An IDO order may include particular entity characteristic(s) including that the IDO order is associated with an entity having securities not previously registered with a regulatory (e.g., governmental) authority and listed on at least one. registered exchange (e.g., a US registered exchange), and therefore not previously eligible to trade on platform 102, and that the IDO order is sent from a designated broker dealer that is registered with platform 102. Order characteristics for an IDO order may include that the order: is designated as a limit order, is a sell side order, is not subject to particular actions (e.g., a cancel action, a cancel and replace action or a modification action), is priced at (or in some examples towards) a lower boundary of a filed price range (e.g., a primary direct listing auction price range), and is sized and valued as indicated in the filing. In addition, an IDO order may include the following auction condition(s): an IDO order is present in the auction, the IDO order is to be executed in full within the auction (e.g., based on a price of the auction), and the primary direct listing security (for the IDO order) is opened at or within an auction price range of the primary direct listing auction (e.g., a price of the auction is within the filed range. Yet further, order book storage 206 may permit one IDO order to be stored (e.g., the number of IDO orders may be limited to one). For example, one IDO order may be entered on behalf of an issuer, by one member organization (e.g., a designated broker dealer).

In general, an IDO order may allow an entity that has not previously had its securities registered, to list its securities on platform 102 at the time of effectiveness of a registration statement pursuant to which the entity itself will sell shares in an opening auction. The IDO order may permit a primary direct listing that could be effected if (i) the auction price would be within the price range specified by the entity in its effective registration statement, and (ii) the full quantity of the IDO order (e.g., the shares that the entity seeks to sell in the primary direct listing) can be sold within that price range. In this manner, the IDO order permits orders from particular entities to be included in an auction, under particular order and auction conditions, where such orders were not previously permitted to be included in an auction.

Referring back to order analyzer 212 of order manager 202 (in FIG. 2), order analyzer may analyze the specific order characteristics for IDO orders noted above, together with verification of the entity characteristics (and in some examples, also one or more risk check indications (from order verifier 204). Based on analysis and verification, order analyzer 212 may determine whether the indicated IDO order is a valid order or whether the order should be rejected.

Based on the order analysis and verification (for any order type including IDO orders), order analyzer 212 may determine whether to generate an outgoing message to one or more entities (e.g., an order rejection message, e.g., an order acceptance message, etc.) and/or whether to route the order message 230 to at least one destination. For example, order analyzer 212 may determine that an order message is to be rejected, thus no order message routing may be performed. Instead, order analyzer 212 may prompt outgoing message generator 214 to generate a rejection message (e.g., as message 232) to an order sending entity (e.g., order sending entity(s) 104). As another example, order analyzer 212 may determine that no outgoing message needs to be generated, and that the order message 230 itself (e.g., as message 232) is to be routed to other entity(s) 108 such as an away market). As yet a further example, order analyzer 212 may determine that both an outgoing message (e.g., an acceptance message of an order) should be generated and sent (e.g., as message 232) to order sending entity(s) 104 and that the order message itself should be routed (e.g., as orders 234 or as orders 236). It is understood that the above examples are exemplary and that embodiments of the present disclosure may be used with any other possible examples of outgoing message generation and/or order message routing. In some examples order analyzer 212 may include a verification indication (e.g., a flag, a value, etc.) in order message(s) 230 that have been analyzed and verified.

Outgoing message generator 214 (also referred to herein as generator 214) may be configured, in some examples, to receive an indication from order analyzer 212 to generate an outgoing message for one or more entities. In some examples, the message generation indication may include an indication of a message type to be included (e.g., order confirmed, order rejected, order modified, etc.) and may include an indication of at least one recipient for the message. Generator 214 may be configured to look up an electronic address for the indicated recipient, and may create the electronic message in one or more suitable electronic formats for a particular recipient entity. Generator 214 may be configured provide any generated outgoing messages to message router 216.

Message router 216 may be configured to route one or more of verified order messages and outgoing messages to at least one destination. For example, message router 216 may route at least one verified order and/or outgoing message 232 to one or more entities (such as entity(s) 104, entity(s) 108, etc.). As another example, message router 216 may route at least one verified order message 234 to continuous matching engine 126). As yet another example, message router 216 may route at least one verified order message 236 to order book storage 206.

An important aspect of system 200 is its ability to analyze/verify incoming order messages) 230 in real-time (and/or near real-time) and to also route order and/or outgoing messages (e.g., messages 232-236) to one or more destinations in real time (and/or near real-time). Of significance, the order information in incoming message(s) 230 is time-sensitive. Any delays in transmitting message(s) 230 to their destination may cause any further processing (e.g., order matching internally and/or externally) to become based on stale data, leading to inaccurate transactions. Moreover, any delays in transmitting outgoing message(s) 232 (such as messages related to a status of an order in platform 102 based on order analysis/verification) may cause a delay in the destination entity(s) ability to respond to the outgoing message 232 (such as resubmit an order with one or more corrects, cancel an order, adjust an order, submit a new order, etc.). In some examples, a delay in an outgoing message 232 may be such that it is impossible for the destination entity to respond to the message (e.g., an auction has ended). Accordingly, it is critical that system 200 is configured to continually and in real-time (and/or near real-time) perform the order analysis, verification, feedback (through outgoing messaging) and routing operations described herein.

Storage structure 218 may be configured to store one or more predefined message and/or order parameters (and in some examples one or more rules) that may be used by one or more of message parser 208, order type detector 210, order analyzer 212 and outgoing message generator 214 for performing one or more operations on incoming electronic order messages 230. Storage structure 218 may include any suitable storage structure for storing and retrieving predefined message/order parameters/rules in a computationally efficient and timely manner.

For completeness, an example of order book storage 206 is also shown in FIG. 2. Order book storage 206 represents an example or order book storage structure 120 (FIG. 1). In some examples, order book storage 206 may include at least one order allocation data structure 228. In some examples, orders in order messages 236 may be entered into order allocation data structure 228 according to ranking such that within each price level, orders may be organized according to various order types. For example, Table 1 below shows a non-limiting example ranking that may be implemented. In Table 1, one or more types of displayed orders may have a higher priority in data structure 228, with other orders decreasing in priority (e.g., one or more types of non-displayed orders, one or more types of auction orders), such that one or more types of directed orders may have a lower priority.

TABLE 1

Example order book ranking

| Priority | Order type |
|---|---|
| Higher Priority | Particular type(s) of displayed orders |
|  | Particular types of non-displayed orders |
|  | Particular types of auction orders |
| Lower Priority | Particular types of directed orders |

In some examples, the type(s) of auction orders that may be included in data structure 228 may include auction only orders, such as limit or market orders to be traded in an auction. Non-limiting examples of auction only orders may include one or more of market on open (MOO) orders (e.g., market orders to be matched during an opening or reopening auction), limit on open (LOO) orders (e.g., limit orders to be matched during an opening or reopening auction), market on close (MOC) orders (e.g., market orders to be matched during a closing auction), limit on close (LOC) orders (e.g., limit orders to be matched during a closing auction), and IDO orders.

In some examples, order book storage 206 may be configured to store at least one IDO order under one or more predefined conditions. For example, order book storage 206 may store an IDO order (received among order message(s) 236) on data structure 228 when an IDO order does not already exist on data structure 228 (that has already been entered on behalf of the issuer by one member entity). Otherwise, order book storage 206 may reject the IDO order.

In some examples, one or more auction-only type orders may be designated for an opening or reopening auction before a core trading session begins (e.g., for a core opening auction) or during a halt or a pause (e.g., for a trading halt auction). In some examples, any quantity of these designated orders that are not matched in a designated auction may be cancelled.

It is understood that system 200 represents an exemplary embodiment of the present disclosure and that system 200 may be configured with more or fewer components than shown, may combine two or more components, or may have a different configuration or arrangement of the components.

Figure 3:
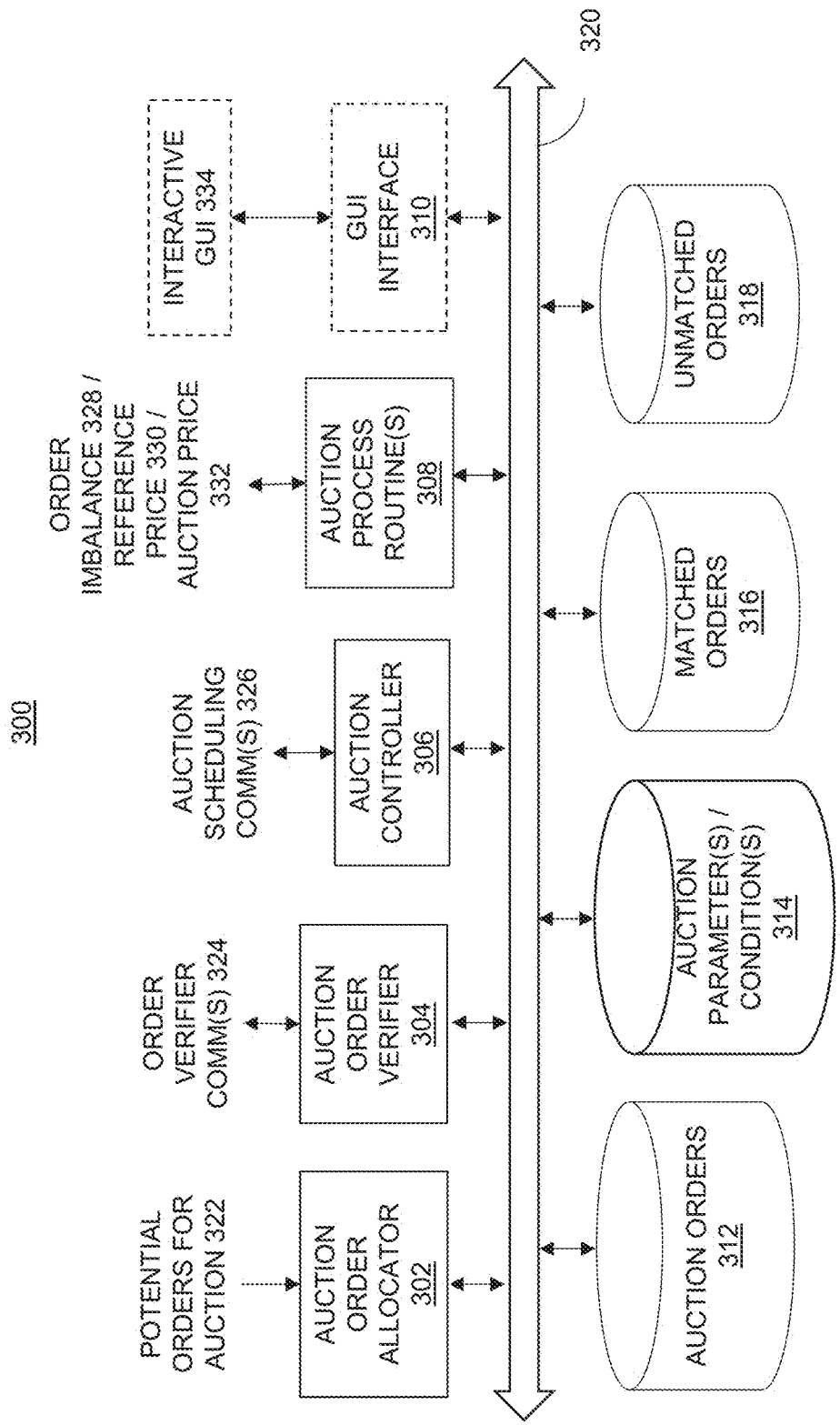
FIG. 3 is a functional block diagram of an example auction engine, according to an aspect of the present disclosure.

Referring now to FIG. 3, a functional block diagram of example auction engine 300 is shown, according to an example of the present disclosure. Auction engine 300 may represent an example of auction engine 130 (FIG. 1). Auction engine 300 may include auction order allocator 302, auction order verifier 304, auction controller 306, one or more auction process routines 308 and storage structures 312-318 that may be in communication via a control and data bus 320. In some examples, auction engine 300 may be configured to communicate with optional GUI interface 310, to receive inputs from and/or provide outputs to optional interactive GUI 334. In some examples, auction engine 300 may be configured to perform electronic auction processing without any user input. In some examples, one or more of components 302-310 may operate in parallel during an auction period. Storage structures 312-318 may include any suitable data structure for storing and retrieving data and/or information in a computationally efficient and timely manner.

Auction order allocator 302 may be configured to obtain potential orders 322 that may be indicated for at least one auction, for example, from order book storage structure 120 (and/or order book storage 206). In some examples, potential orders 322 to be allocated may be determined once an auction price 332 has been determined (e.g., via auction process routine(s) 308 and/or via one or more user indications from optional interactive GUI 334). In some examples, the potential orders 322 to be allocated may be based on the type of auction (e.g., an opening auction, a trading halt auction, a closing auction). In some examples, the allocation may include comparing potential orders 322 to one or auction conditions (e.g., based on the specific order type, such as an IDO order) and including potential orders 322 that meet the auction condition(s) in the allocation (for participation in the auction). In some examples, exclusion of a potential order 322 that does not meet the auction condition(s) may cause the particular order to be excluded from the auction (e.g., to cancel participation in the auction). In some examples, exclusion of a potential order 322 may cause the auction itself to be canceled. In some examples, the allocation may include ranking approved orders for the auction (among potential orders 322) by order type and allocating an individual auction price for each particular order (e.g., based on order type) for the auction.

In a non-limiting example, the allocation may include ranking and allocating an individual auction price for MOO orders, market orders, displayed limit and LOO orders, and at least one IDO (sell) order that is priced at or lower than an execution price. In some examples, one or more buy DMM orders (e.g., that meet predefined auction condition(s)) may also be included in the allocation. In some examples, allocated orders may be stored in auction order storage structure 312 according to their respective ranking and allocated individual auction prices.

Auction order verifier 304, in some examples, may perform one or more risk check evaluations of potential orders 322 (e.g., via communication(s) 324 with order verifier 204). In some examples, auction order verifier 304 may operate in parallel with auction order allocator 302 to allocate and verify auction orders among potential orders 322.

Auction controller 306 may be configured to communicate with auction scheduler 134 (FIG. 1) to obtain indications of one or more of at least one pre-auction period, an auction start time, an auction end time, an auction duration and the like. Auction controller 306 may also be configured to communicate, in some examples, with optional GUI interface 310, to receive user input from at least one authorized user (via optional interactive GUI 334) which user inputs may also be used to control one or more operations of auction engine 300. In general, auction controller 306 may be configured to control one or more operations of one or more among auction order allocator 302, auction order verifier 304, auction process routine(s) 308, optional interactive GUI 334 (in some examples), and storage structures 312-318. In some examples, auction controller 306 may control operations among components 302 and 306-318 based on indications from auction scheduling communication(s) 326, including activating one or more components of auction engine 300 and/or terminating operation of one or more components of auction engine 300 (including, in some examples, halting and/or canceling an auction).

Auction process routine(s) 308 may be configured to perform one or more operations related to initiation of an auction, order matching throughout the auction, and termination of an auction over an auction period. In general, auction process routine(s) 308 may use an order imbalance 328 (that may vary throughout the auction), reference price 330 and auction price 332 (e.g., that may be determined prior to the auction) to perform the order matching of the auction orders (stored in storage structure 312) during the auction. In general, reference price 330 refers to a single price published in advance of the electronic auction (which price desirably would be the lower end of the range of the registration statement for an IDO order). Auction price 332 (also referred to herein as an execution price) refers to the actual price at which the electronic auction would be conducted. In some examples, auction process routine(s) 308 may also use one or more auction parameters and/or auction conditions (stored in storage structure 314) to perform order matching during the auction. In a non-limiting example, the auction parameter(s) (stored in storage structure 314) may include one or more of an auction order maximum quantity (which may depend on order type), a primary listing auction price range (e.g., for securities indicated as a primary direct listing), an IDO quantity (e.g., defining a quantity the IDO order should equal, a zero value indicating that IDO order(s) may be rejected) and an IDO broker dealer (indicting the broker dealer permitted to enter the IDO order). In some examples, an IDO order may be guaranteed to participate in a direct listing auction at auction price 332. If the limit price of the IDO order is equal to auction price 332, the IDO Order may be provided priority at that price.

Responsive to order matching during the auction, auction process routine(s) 308 may generate one or more matched orders and/or one or more unmatched orders, which may be stored in respective storage structures 316 and 318. In some examples, one or more unmatched orders may be released to continuous matching engine 128 (e.g., upon termination of the auction). For example, unexecuted portions of orders not designated for 'auction only' may be released to continuous matching engine 128. In some examples, one or more unmatched orders (stored in storage structure 318) may be cancelled (e.g., via auction controller 306 and/or via user input from optional interactive GUI 334, such as based on the order type). In some examples, any matched order(s) (stored in storage structure 316) may be transferred, upon termination of the auction to transaction storage structure 138 (FIG. 1).

In some examples, auction process routine(s) 308 may be configured to determine an opening order imbalance as well as any order imbalances throughout the auction (referred to generally as order imbalance 328). In some examples, order imbalance 328 may include a determination of a side of an imbalance (e.g., buy or sell), to determine the side with a greater 'has to go' quantity. In some examples, a buy side 'has to go' quantity may be determined as a sum of an aggregated size of all eligible buy orders priced above the reference price and all buy MOO and market orders. In some examples, a sell side 'has to go' quantity may be determined as a sum of aggregated size of all eligible sell/sell short/sell short exempt orders priced below the reference price, a (sell) IDO order priced at or below the reference price and all sell/sell short/sell short exempt MOO and market orders. In some examples, if the buy side 'has to go' quantity is the same as the sell side 'has to go' quantity, then the side of the imbalance may be set to 'none' and a total imbalance quantity may be set to zero.

In some examples, a total imbalance quantity may also be determined. For example, if there is an imbalance side, a total imbalance quantity may represent a difference between the 'has to go' quantity on the side of the imbalance and a total quantity of all orders eligible to participate in the auction that is marketable at the reference price (both at priced and better priced) on the opposite side.

In some examples, optional interactive GUI 334 (via optional GUI interface 310) may interact with auction engine 300, so that at least one authorized user (e.g., an administrator, a DMM (e.g., among MM entity(s) 106), and the like) may interact with (e.g., provide at least some management of) an auction performed by auction engine 300. In general, an authorized user may include any user permitted (e.g., based on one or more predefined user credentials) to interact with auction engine 300, such as an administrator, a DMM, a MM and the like.

In a non-limiting example, an authorized user may determine auction price 332 for a core opening auction and/or a trading halt auction, for example by interaction with information stored on platform 102 via user input, display and/or analysis tools of optional interactive GUI 334. In some examples, if an imbalance is indicated, the authorized user may select an auction price 332 at which all better-priced orders on the side of the imbalance can be satisfied. In some examples, the authorized user may not cause a direct listing auction for a primary direct listing to be conducted by auction engine 300 when the auction price 332 would be below a lowest price or above a highest price of the primary direct listing auction price range or there may be insufficient buy interest to satisfy both the IDO order and all better priced sell orders in full.

In one non-limiting example, an authorized user may provide DMM participant allocation to auction engine 300, via optional interactive GUI 334. For example, at-priced DMM orders may be included as part of allocated orders for an auction (e.g., in storage structure 312), for example, based on a time of entry and any other orders or interest that may join a position among the allocated orders. In some examples, a parity allocation to a DMM participant may be allocated according to a price-time priority ranking (e.g., among the auction orders). In some examples, both at-priced DMM orders that do not receive an allocation and that lock other unexecuted orders and buy and sell better-priced DMM orders may be cancelled after the auction processing period concludes.

It is understood that auction engine 300 represents an exemplary embodiment of the present disclosure and that auction engine 300 may be configured with more or fewer components than shown, may combine two or more components, or may have a different configuration or arrangement of the components.

Some portions of the present disclosure describe embodiments in terms of algorithms and symbolic representations of operations on information. These algorithmic descriptions and representations are used to convey the substance of this disclosure effectively to others skilled in the art. These operations, while described functionally, computationally, or logically, are to be understood as being implemented as data structures, computer programs or equivalent electrical circuits, microcode, or the like. Furthermore, at times, it may be convenient to refer to these arrangements of operations as modules or algorithms. The described operations and their associated modules may be embodied in specialized software, firmware, specially-configured hardware or any combinations thereof.

Figure 4:
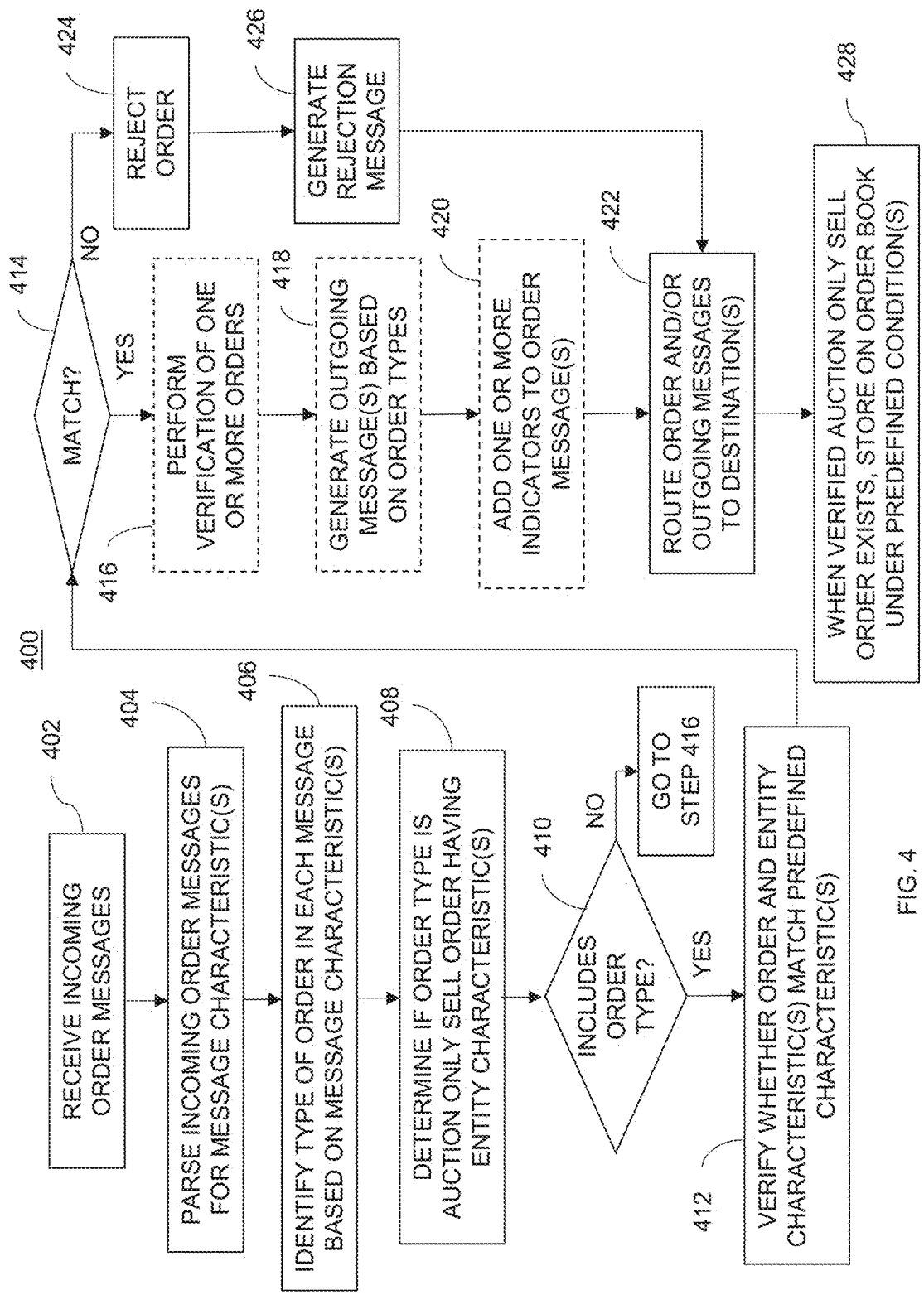
FIG. 4 is a flowchart diagram of an example method for verifiable order message handling of incoming order messages, including messages that may be suitable for an electronic auction, according to an aspect of the present disclosure.
Figure 5:
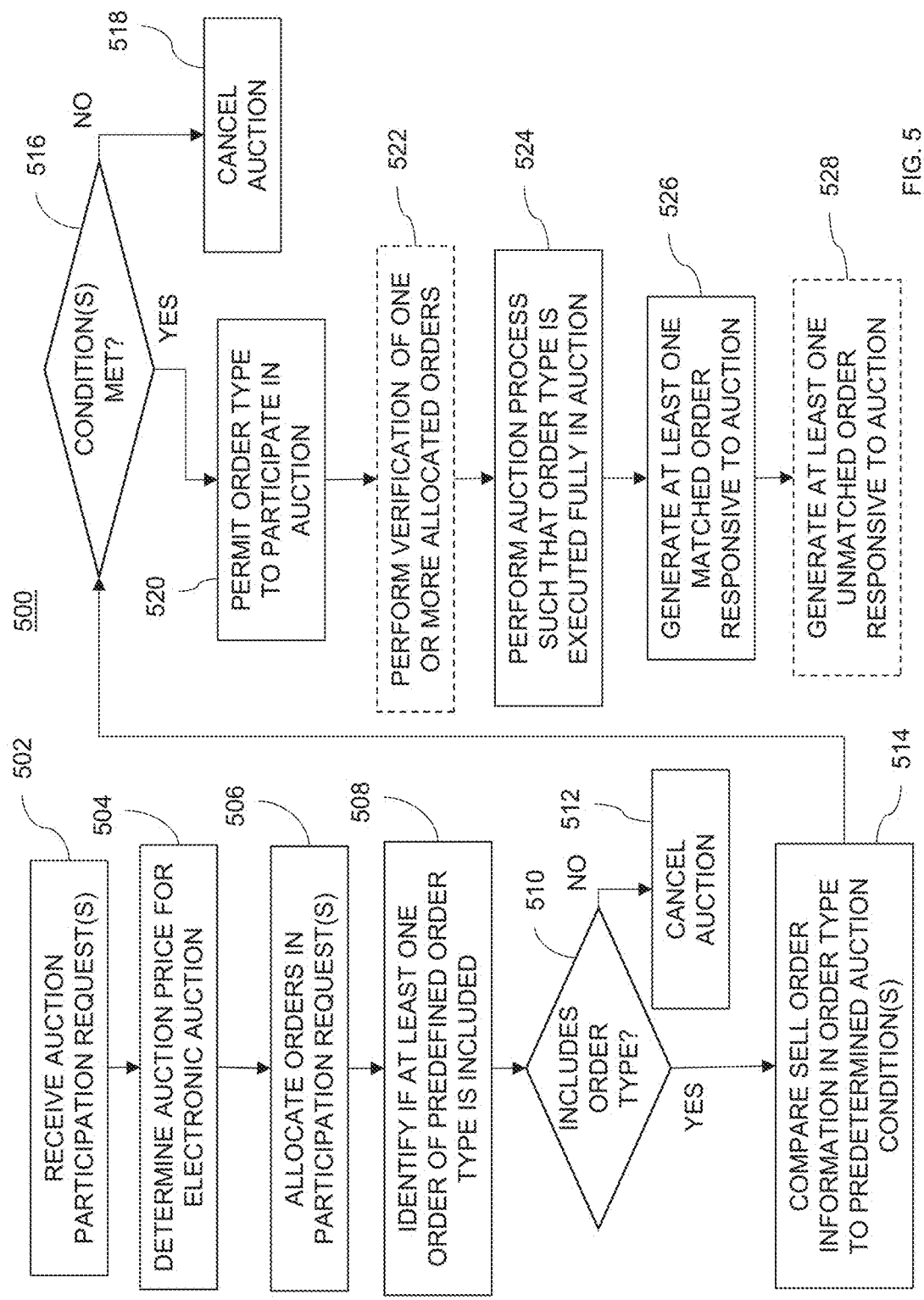
FIG. 5 is a flowchart diagram of an example method for performing an electronic auction with verified order data, according to an aspect of the present disclosure.

Platform 102 (and/or system 200 or auction engine 300) may be configured with more or less components to conduct the methods described herein with reference to FIGS. 4 and 5. In particular, FIG. 4 is a flowchart diagram illustrating an example method for verifiable order message handling of incoming order messages, including messages that may be suitable for an electronic auction, according to an aspect of the present disclosure; and FIG. 5 is a flowchart diagram illustrating an example method for performing an electronic auction with verified order data, according to an aspect of the present disclosure. As illustrated in FIGS. 4 and 5, the methods shown may be performed by processing logic that may comprise hardware (e.g., circuitry, dedicated logic, programmable logic, microcode, etc.), software (such as instructions run on a processing device), or a combination thereof. In one embodiment, the methods shown in FIGS. 4 and 5 may be performed by one or more specialized processing components associated with components 110-142 of system 100 of FIG. 1 (as well as components of FIGS. 2 and/or 3). It is understood that methods shown in FIGS. 4 and 5 represents a non-limiting example of handling electronic order messages and performing electronic auctions related to IDO orders. The methods may also be implemented to handle any other type of electronic messages anticipated by the present disclosure.

Referring next to FIG. 4, a flowchart diagram of an example method 400 for verifiable order message handling of incoming order messages. At step 402, order router/manager 116 (order manger 202) may receive one or more incoming electronic order messages (e.g., via order/execution interface(s) 110) from among order sending entity(s) 104. At step 404, order router/manager 116 (order manger 202) may parse the incoming order messages to identify and extract one or more message characteristics. At step 406, order router/manager 116 (order manger 202) may identify an order type in each message based on the identified message characteristic(s) (step 404), for example, based on one or more predefined stored message type parameters.

At step 408, order router/manager 116 (order manger 202) may determine whether the order type indicates an IDO order (i.e., an auction only sell order having one or more entity characteristics). When it is determined, at step 410 that the order type indicates an IDO order, step 410 may proceed to step 412. When it is determined that the order type does not indicate an IDO order, step 410 may proceed to step 416.

At step 412, order router/manager 116 (order manger 202), via order verifier 118 (204) may determine whether order characteristics and entity characteristic(s) indicated among the (extracted) message characteristics matches predefined order characteristics and at least one predefined entity characteristic. For example, the predefined order characteristics may include that the IDO order is a limit on open, that the IDO order is priced at a lower end of the filed price range and that the IDO order is sized and valued as indicated in the filing (registration). For example, step 412 may include comparing an MPID extracted from the order message to one or more predefined MPIDs, to determine whether an indicated IDO order is sent from a designated broker dealer that is registered with platform 102 (entity characteristics), based on the MPID comparison. At step 414, it is determined whether the IDO order matches the predefined order and entity characteristic(s). When it is determined, that the IDO order matches the predefined order and entity characteristic(s), step 414 may proceed to optional step 416.

At optional step 416, order verifier 118 (204) may perform a verification of one or more order messages (including, in some examples of an IDO order). In some examples, the verification may include one or more risk check evaluations. In some examples, order router/manager 116 (order manger 202) may perform one or more verifications of the message characteristic(s) (e.g., that the order message is missing information (e.g., is incomplete), includes incorrect information, does not match information to be included for a particular order type, that an order action for an order type is permissible, and the like).

At optional step 418, order router/manager 116 (order manger 202) may generate one or more outgoing messages to one or more entity(s) (e.g., order sending entity(s) 104, other entity(s) 108, etc.), based on analysis of the order messages in steps 402-416. For example, an outgoing message may indicate rejection of an order, acceptance of an order, acceptance to modify an order, transfer of an order to an away market and the like.

At optional step 420, order router/manager 116 (order manger 202) may add one or more indicators to an order message responsive to verification of the message characteristic(s). In some examples, the verification indication(s) may be used by internal and/or downstream components to ensure that processing of orders is not disrupted due to any errors in the order message.

At step 422, order router/manager 116 (order manger 202) may route verified order message(s) and/or outgoing message(s) (including any IDO orders) to one or more destinations, based on the analysis and verification in steps 402-418. In some examples, the destination(s) may include one or more of order book storage structure 120 (206), continuous matching engine 128, order sending entity(s) 104, MM entity(s) 106, other entity(s) 108).

When it is determined, at step 414, that the IDO order does not match the predefined entity characteristic(s), step 414 may proceed to step 424. At step 424, the IDO order may be rejected. At step 426, a rejection message for the IDO order may be generate. Step 426 may proceed to step 422 and the rejected IDO order message may be sent to an appropriate destination (e.g., order sending entity(s) 104).

At step 428, when a verified IDO order exist, order router/manager 116 (order manger 202) may route the IDO order to order book storage structure 120 (206). Order book storage structure 120 (206) may store the IDO order under one or more predefined conditions. For example, the IDO order may not be stored, when an IDO order already exists on order book storage structure 120 (206). In this case, the IDO order may be rejected.

Referring next to FIG. 5, a flowchart diagram of an example method 500 for performing an electronic auction with verified order data. At step 502, auction engine 130 (300) may receive one or more auction participation requests. The participation requests may include one or more potential orders stored in order book storage structure 120 (206) that may be suitable for an electronic auction. At step 504, an auction price may be determined for an electronic auction. In some examples, the auction price may be determined automatically by auction engine 130 (300). In some examples, the auction price may be determined based on user input from at least one authorized user (e.g., an administrator, a DMM, etc.) (e.g., via interactive GUI 334).

At step 506, auction engine 130 (300) may allocate one or more orders among the auction participation requests for a particular auction, based on the auction price. For example, the orders may be ranked and priced based on the auction price. In some examples, one or more order characteristics of the participation requests (potential orders) may be compared against one or more auction condition(s) to determine whether the participation requests are eligible for the auction. In some examples, ineligible participation requests may be excluded from the auction.

At step 508, auction engine 130 (300) may identify whether at least one order of a predefined order type (i.e., an IDO order) is included among the auction participation requests. When it is determined, at step 510, that an IDO order is not included, the auction may be canceled (at step 512). When it is determined, at step 510, that an IDO order is included, step 510 may proceed to step 514.

At step 514, auction engine 130 (300) may compare sell order information in the IDO order to predetermined auction condition(s) (e.g., the auction price should fully execute the IDO order). When it is determined, at step 516, that the auction condition(s) for the IDO order are not met, the auction may be canceled (at step 518).

When it is determined, at step 516, that the auction condition(s) for the IDO order are met, step 516 may proceed to step 520. At step 520, auction engine 130 (300) may permit the IDO order to participate in the auction (i.e., the auction is permitted to proceed with the IDO order).

At optional step 522, auction engine 130 (300) may perform a verification of one or more of the allocated orders (including, in some examples, the IDO order). In some examples, the verification may include one or more risk check evaluations (e.g., via order verifier 118 (204)). In some examples, unverifiable orders may be excluded from the auction.

At step 524, auction engine 130 (300) may perform an auction process such that the IDO order is executed fully in the auction. In some examples, the auction process may include matching one or more orders among the allocated orders based on one or more order imbalances over an auction period.

At step 526, auction engine 130 (300) may generate at least one matched order responsive to the auction. At optional step 528, auction engine 130 (300) may generate at least one unmatched order responsive to the auction.

Figure 7A:
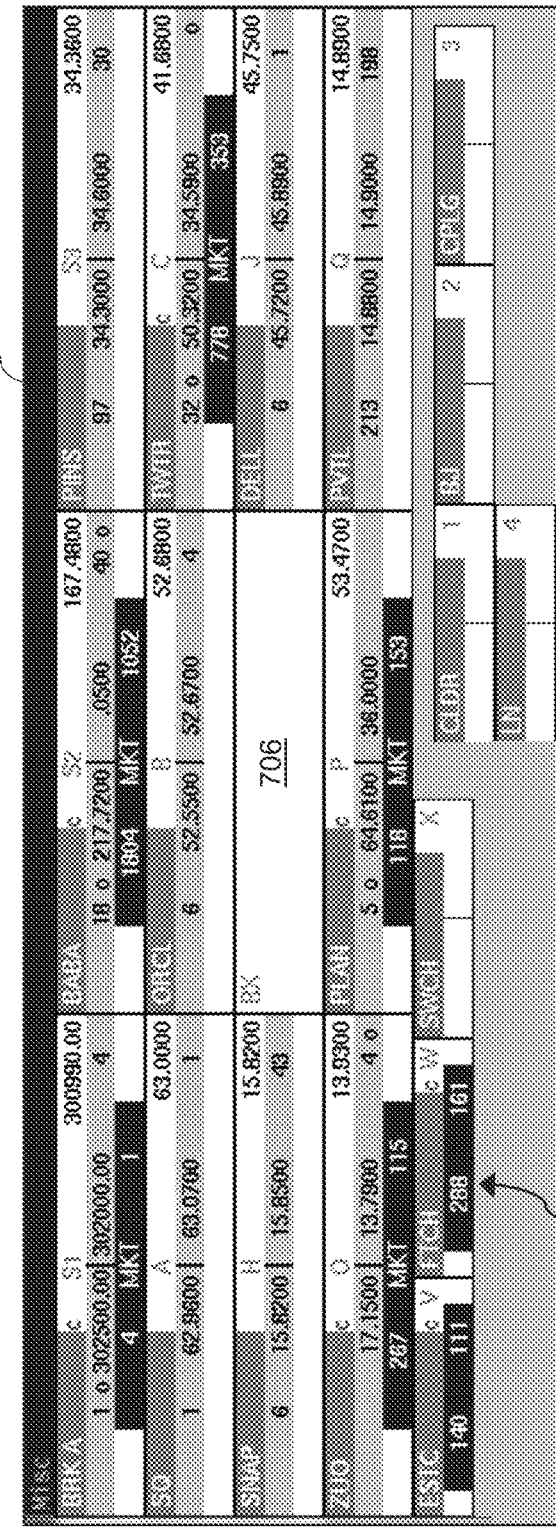
FIGS. 7A and 7B are screenshots of an example designated market maker (DMM) graphical user interface (GUI) according to an aspect of the present disclosure.
Figure 8A:
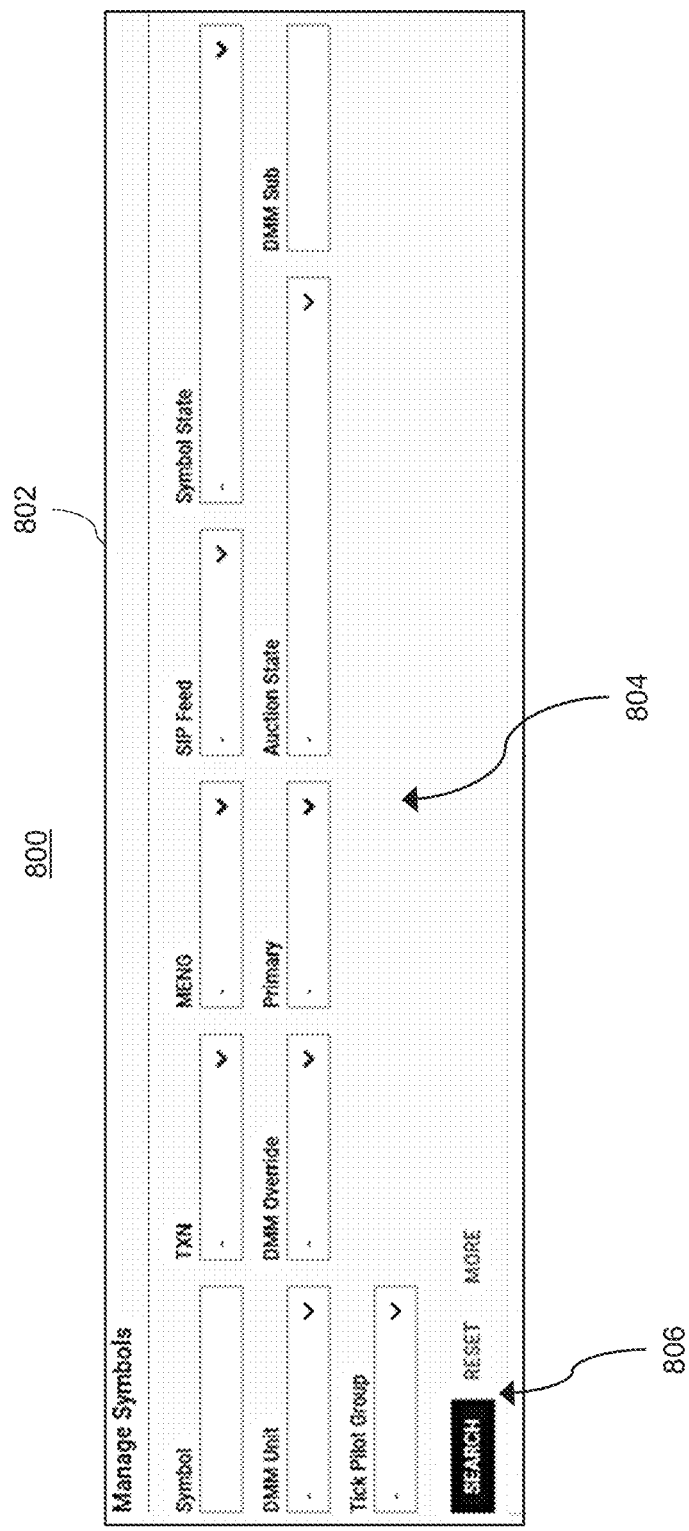
Figure 8B:
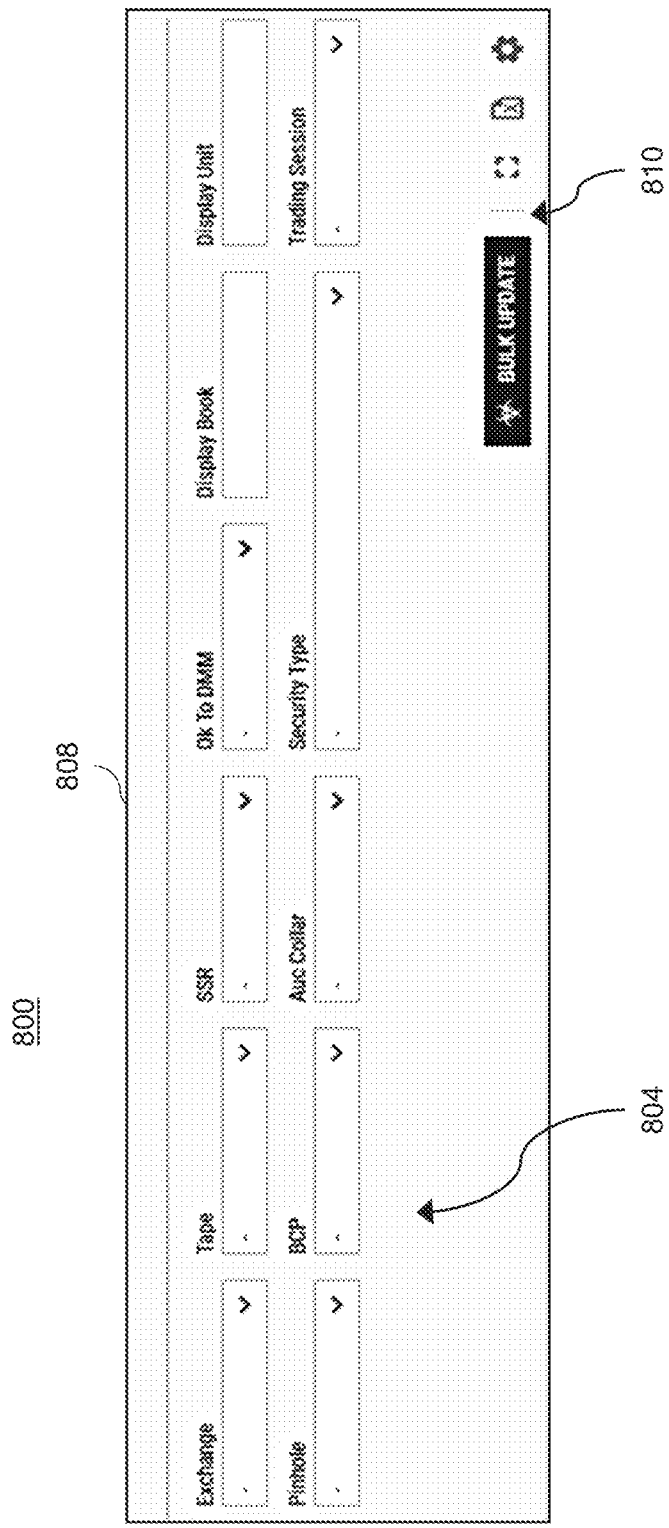
Figure 8D:
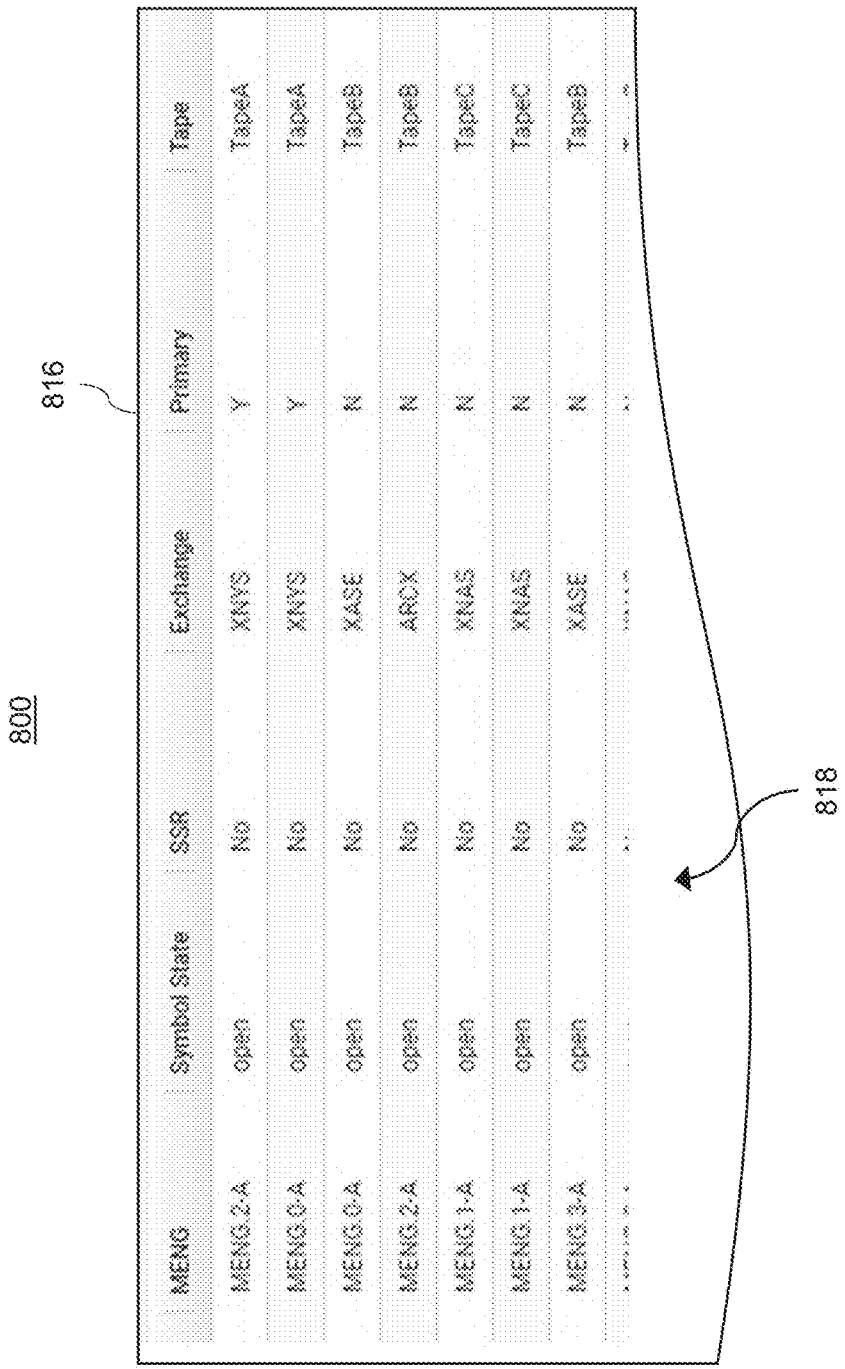
Figure 9A:
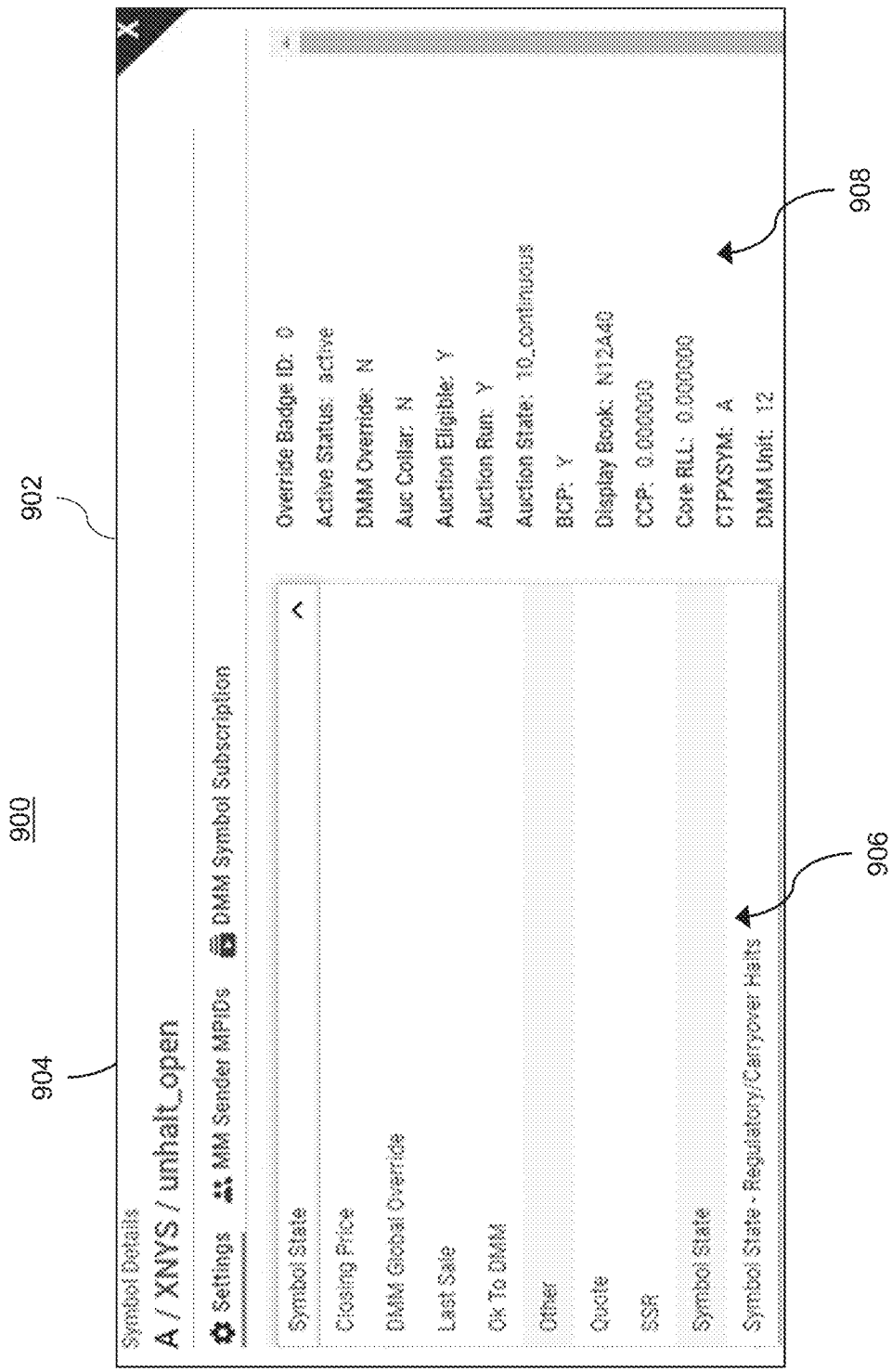
FIGS. 9A and 9B are screenshots of an example pop-up window of the administrator GUI shown in FIGS. 8A-8E, according to an aspect of the present disclosure.
Figure 9B:
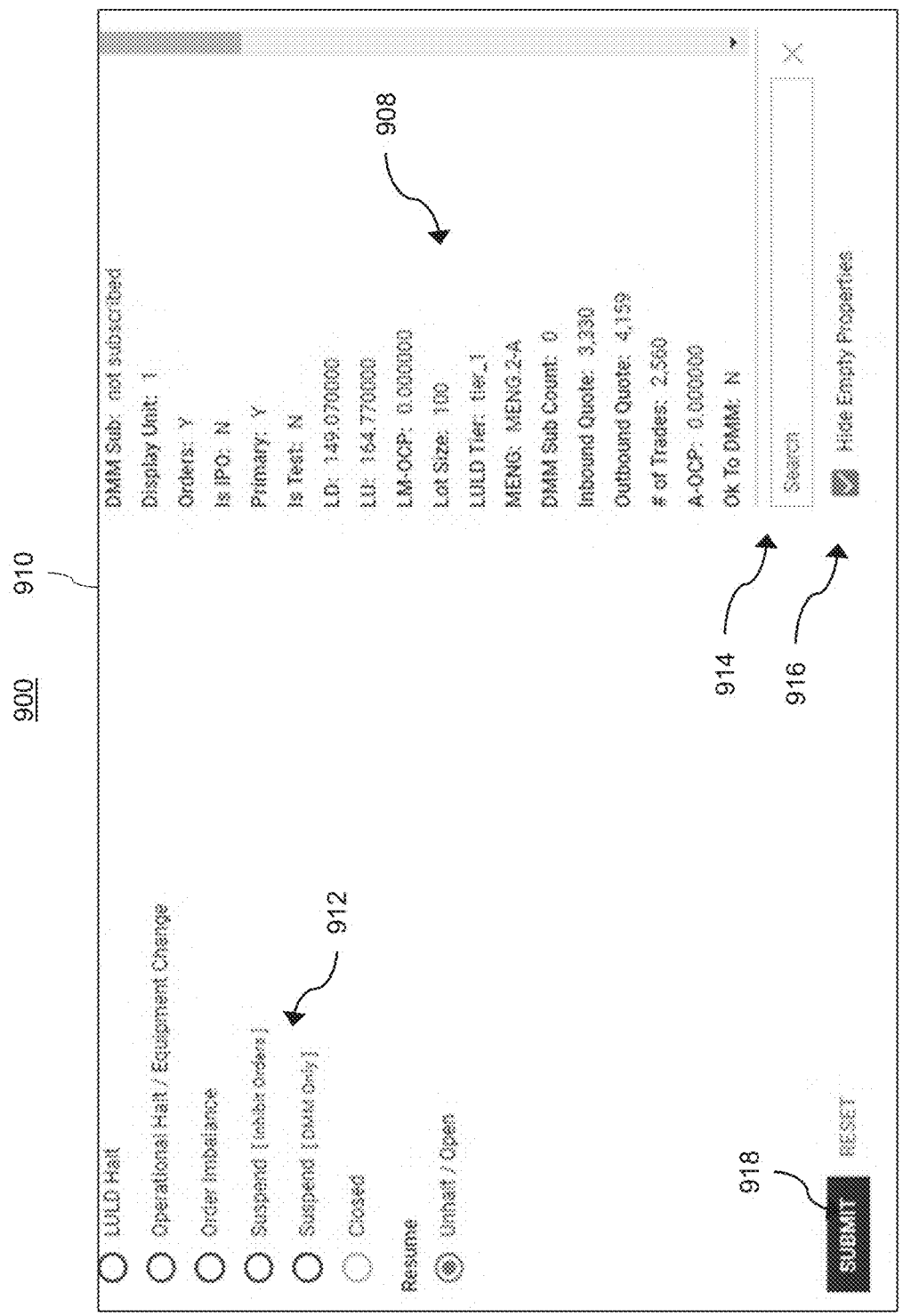
Figure 10A:
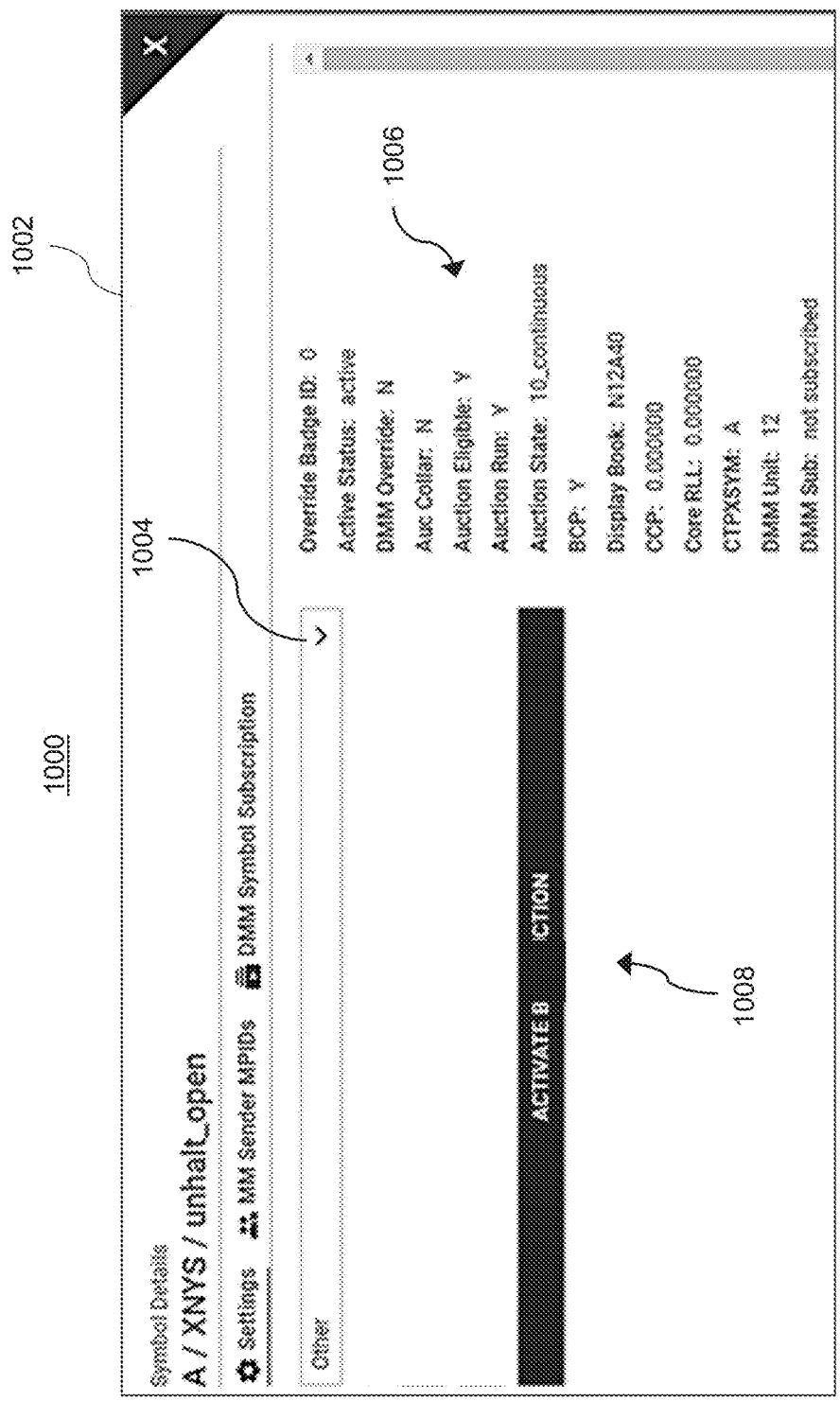
FIGS. 10A and 10B are screenshots of another example pop-up window of the administrator GUI shown in FIGS. 8A-8E, according to an aspect of the present disclosure.
Figure 10B:
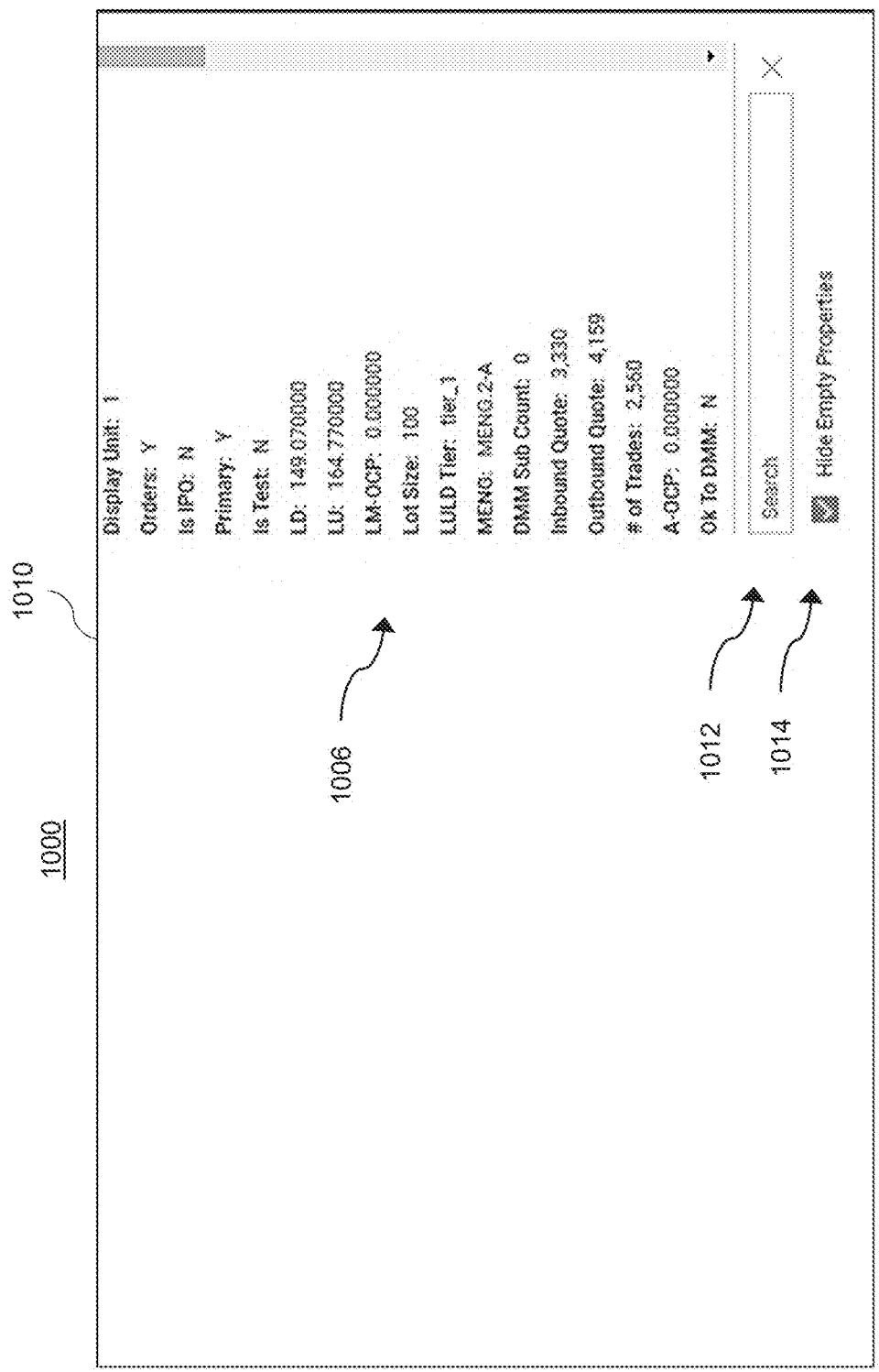

Referring next to FIGS. 7A-10B, examples of interactive GUIs for authorized users that may be part of platform 102 (FIG. 1) are described, according to aspects of the present disclosure. More particularly, FIGS. 7A and 7B are screenshots of example DMM GUI 700 for interaction with platform 102 via a DMM (e.g., an example of an authorized user); FIGS. 8A-8E are screenshots of example administrator GUI 800 for interaction with platform 102 via an administrator (e.g., another example of an authorized user); FIGS. 9A and 9B are screenshots of example pop-up window 900 of administrator GUI 800; and FIGS. 10A and 10B are screenshots of example pop-up window 1000 of administrator GUI 800. Although exemplary sections/windows are depicted in FIGS. 7A-10B, alternative configurations for the sections/windows are envisioned. For example, each interactive GUI (e.g., GUIs 700 and 800) may include more or fewer sections, windows, webpages and/or tabs. Additionally, the sections/windows may be reorganized and displayed to optimize GUI space and efficient utilization of pertinent information.

Figure 7B:
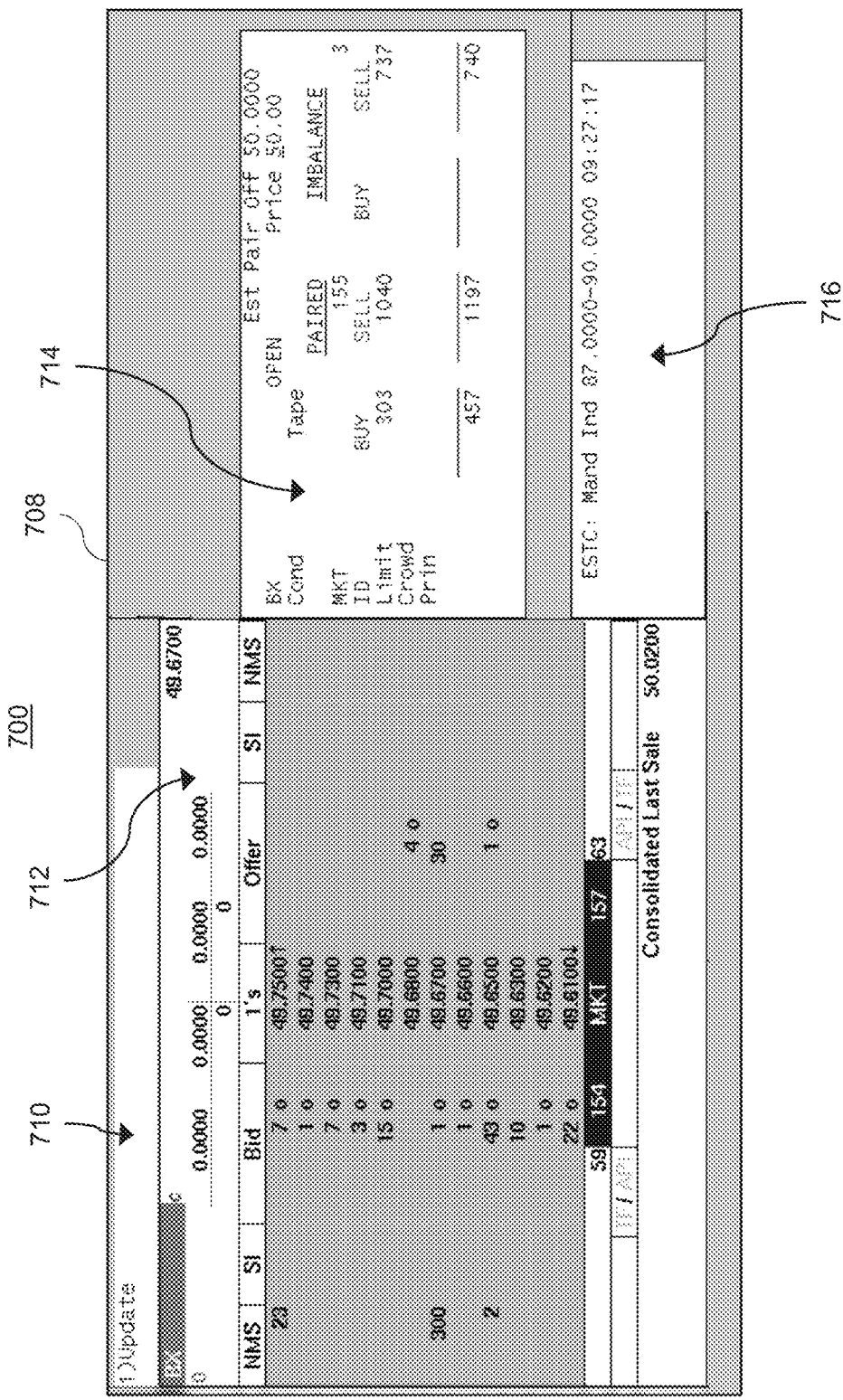

Referring to FIGS. 7A and 7B, example screenshots of DMM GUI 700 are shown. FIG. 7A illustrates first portion 702 of DMM GUI 700 and FIG. 7B illustrates second portion 708 of DMM GUI 700. Together, first portion 702 and second portion 708 illustrate various regions (704, 710, 712, 714 and 716) for a DMM to review and/or interact with various securities, to provide at least some management of an auction (e.g., performed by auction engine 130).

Securities selection region 704 (also referred to as region 704), in first portion 702, may include one or more selectable security elements (e.g., nineteen security elements as shown FIG. 7A) including, in some examples, security elements in a pre-open state and/or an open state. For each security element in region 704, GUI 700 may include the most up-to-date security information (as available). In some examples, the security information displayed in the security element (if any) may depend on one or more predefined conditions and/or predefined events. For example, a security element may not show security information except for predefined condition(s) and/or predefined event(s). In this manner, GUI 700 may provide an improved user interface, where the arrangement and display of information allows the user to better identify and focus on particular information of interest. In FIGS. 7A and 7B, an example of GUI 700 for selection of security element 706 (e.g., security element 'BX') is shown.

As shown in FIG. 7B, second portion 708 of GUI 700 may include option menu region 710, template region 712, imbalance region 716 and message window 716. Option menu region 710 may display one or more selectable options (an 'Update' option is illustrated) that may be available for a currently opened template (in template region 712). Template region 712 may include user display and/or input tools (e.g., textual input tools), that may depend upon an option selected in option menu region 710, for allowing a DMM to view and/or interact with the most up-to-date (i.e., current) bids and/or offers for a particular security element (e.g., 'BX'). In FIG. 7B, an opening auction template is shown in template region 712. In general, template region 712 may include one ore selectable templates, such as (without being limited to) an opening auction template, a quoting template, a closing auction template, an indications template and the like. Imbalance region 714 may provide the most up-to-date (i.e., current) imbalance information associated with a particular security element (e.g., 'BX'). Message window 716 may display one or more relevant messages for the DMM to action.

Referring to FIGS. 8A-8E, example screenshots of administrator (admin) GUI 800 are shown. FIGS. 8A and 8B illustrates respective first user-selection portion 802 and second user selection portion 808 of admin GUI 800. FIGS. 8C-8E provide respective security information portions 812, 816 and 820. Together, portions 802, 808, 812, 816 and 820 of admin GUI 800 provide interactive management tools for an administrator to select one or more securities, filter tools to filter securities presented in display regions 814, 818 and 822, and facilitate an opening auction (e.g., to provide at least some management of an auction that may be performed by auction engine 130).

Referring to FIGS. 8A and 8B, first user-selection portion 802 and second user-selection portion 808 include user-selection tools 804 for selecting a security (also referred to as a symbol), filtering securities shown in display regions 814, 818 and 822 based on one or more selected filter criteria, managing a security, and facilitating an opening auction, such as (without being limited to) text input boxes and/or drop down selection tools. First user-selection portion 802 may also include additional user tools 806, such as (without being limited to) search, reset and additional options. Second user-selection portion 808 may also include additional user tools 810, such as bulk update, display and setting options.

Referring to FIGS. 8C-8E, display regions 812, 816 and 820 may include respective security information portions 814, 818 and 822. Regions 814, 818 and 822 may display information on one or more securities in accordance with user-selection tools 804 of FIGS. 8A and 8B. In some examples, a user may first view a number of securities (symbols) shown in display regions 812, 816 and 820 (FIGS. 8C-8E). The user may create one or more filter criteria using user-selections tools 804 (FIGS. 8A and 8B), to reduce the number of securities (symbols) displayed in display regions 812, 816 and 820 based on the selected filter criteria.

Referring to FIGS. 9A and 9B, pop-up window 900 of admin GUI 800 is shown. Pop-up window 900 may be generated upon selection of 'symbol state' among user-selection tools 804 (FIG. 8A). Pop-up window 900 may include first portion 902 and second portion 910 shown in respective FIGS. 9A and 9B. Pop-up window 900 illustrates a first window that may be used by an administrator to approve the running of an opening auction. In general, pop-up window 900 may provide an administrator with the ability to select a state for a security (also referred to as a symbol) review parameters for the security, select actions for a security and submit information to initiate an opening auction.

Pop-up window 900 may include tab region 904 for user-selection of one or more tabs associated with pop-up window 900. In FIG. 9A, a 'Settings' tab in tab region 904 has been selected. Other tabs in tab region 904 may provide information on MM sender MPIDs and one or more DMM symbol (security) subscriptions.

Pop-up window 900 may include drop-down user-selection region 906 for selecting a state for the security. In one embodiment, one of the states that may be selected may include 'Other.' Selection of the 'other' state in region 906 may be associated with an opening auction. Pop-up window 900 may also include display region 908, action selection region 912, search region 914 and setting region 916.

Display region 908 (shown in first portion 902 and second portion 910) may provide information on one or more parameters associated with a security. For example, display region 908 may provide the administrator with the ability to review whether a security is eligible for an opening auction. Action selection region 912 may include one or more user input tools for selecting at least one action for a security. Search region 914 may include one or more user input tools for searching for information associated with a security. Setting region 916 may include one or more user tools for displaying or hiding empty properties (shown in display region 908).

Pop-up window 900 may also include submission/reset buttons 918, for user input to submit the security (when 'Other' is selected in region 906) for an opening auction (when the 'submit' button is selected) or to reset information in pop-up window 900 (when the 'reset' button is selected). Selection of the 'submit' button (among buttons 918) may generate pop-up window 1000 (FIGS. 10A and 10B).

Pop-up window 1000 represents a second window that may be used by an administrator to approve the running of an opening auction. In other words, pop-up window 900 (FIGS. 9A and 9B) may provide the administrator the ability to manage different operations and actions with a security (including initiating approval for an opening auction). Pop-up window 1000 (FIGS. 10A and 10B) may provide the administrator the ability to further review auction information and approve the running (activation) of the opening auction.

Referring to FIGS. 10A and 10B, pop-up window 1000 of admin GUI 800 is shown. Pop-up window 1000 may include first portion 1002 and second portion 1010 shown in respective FIGS. 10A and 10B. Pop-up window 1000 may include drop-down user-selection region 1004 for selecting a state for the security. Pop-up window 1000 may also include display region 1006, auction activation button 1008, search region 1012 and setting region 1014.

Display region 1006 (shown in first portion 1002 and second portion 1010) may provide information on one or more parameters associated with an auction. Auction activation button 1008 may be selected by an administrator to activate the running of an opening auction. Search region 1012 and setting region 1014 are similar to respective search region 914 and setting region 916. In some examples, once the administrator has activated the running of an opening auction (via auction activation button 1008 in FIG. 10A), the opening auction may proceed subject to facilitation by a DMM, such as for an opening auction for direct listings involving IDO order(s). In some examples, pop-up windows 900 and 1000 may be used by a DMM, rather than an administrator, for facilitating a direct listing auction involving IDO order(s).

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through a network or wireless links. Computers may also comprise of software which may direct the operations of the aforementioned components. Computers may be referred to as servers, personal computers (PCs), mobile devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic exchange system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, an on-site computing device specially configured for a particular entity, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the systems and methods described herein, such as, for example, any public and/or private networks, including, for instance, the internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 6:
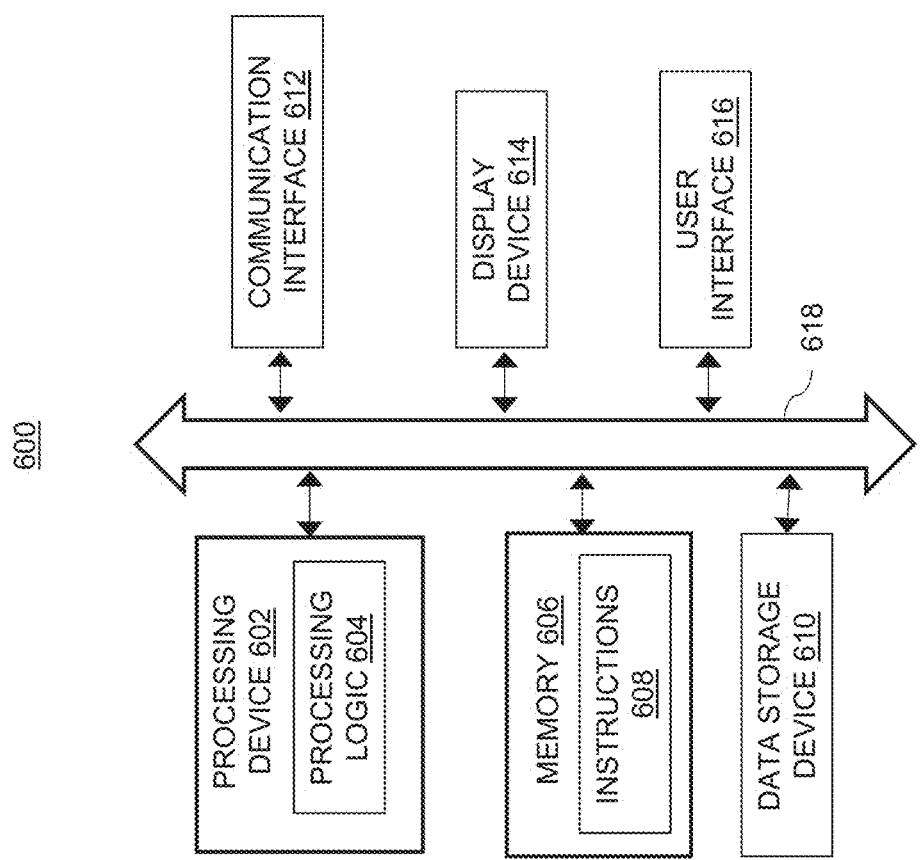
FIG. 6 is a functional block diagram of an example computer system according to an aspect of the present disclosure.

FIG. 6 illustrates a functional block diagram of a machine in the example form of computer system 600 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, one or more of components 110-142 of platform 102, order sending entity(s) 104, MM entity(s) 106 and/or distribution entity(s) 108, one or more components 202-206 of system 200 and/or one more components 302-318 of auction engine 300 may be implemented by a specialized machine, particularly programmed to perform certain functions, such as the example machine shown in FIG. 6 (or a combination of two or more of such machines).

Example computer system 600 may include processing device 602, memory 606, data storage device 610 and communication interface 612, which may communicate with each other via data and control bus 618. In some examples, computer system 600 may also include display device 614 and/or user interface 616.

Processing device 602 may include, without being limited to, a microprocessor, a central processing unit, an application-specific integrated circuit (ASIC), a field programmable gate array (FPGA), a digital signal processor (DSP) and/or a network processor. Processing device 602 may be configured to execute processing logic 604 for performing the operations described herein. Processing device 602 may include a special-purpose processing device specially programmed with processing logic 604 to perform the operations described herein.

Memory 606 may include, for example, without being limited to, at least one of a read-only memory (ROM), a random access memory (RAM), a flash memory, a dynamic RAM (DRAM) and a static RAM (SRAM), storing computer-readable instructions 608 executable by processing device 602. Memory 606 may include a non-transitory computer readable storage medium storing computer-readable instructions 608 executable by processing device 602 for performing the operations described herein. For example, computer-readable instructions 608 may include operations performed by components 110-142 of platform 102 (FIG. 1), components 202-206 of system 200 (FIG. 2) and/or components 302-318 of auction engine 300 (FIG. 3), including operations shown in FIGS. 4 and 5. Although one memory device 606 is illustrated in FIG. 6, in some examples, computer system 600 may include two or more memory devices (e.g., dynamic memory and static memory).

Computer system 600 may include communication interface device 612, for direct communication with other computers (including wired and/or wireless communication) and/or for communication with a network. In some examples, computer system 600 may include display device 614 (e.g., a liquid crystal display (LCD), a touch sensitive display, etc.). In some examples, computer system 600 may include user interface 616 (e.g., an alphanumeric input device, a cursor control device, etc.).

In some examples, computer system 600 may include data storage device 610 storing instructions (e.g., software) for performing any one or more of the functions described herein. Data storage device 610 may include a non-transitory computer-readable storage medium, including, without being limited to, solid-state memories, optical media and magnetic media.

While the present disclosure has been discussed in terms of certain embodiments, it should be qualified that the present disclosure is not so limited. The embodiments are explained herein by way of example, but there are numerous modifications, variations and other embodiments that may be employed that would still be within the scope of the present disclosure.

The invention claimed is:

1. A system comprising:
a computer platform comprising at least one processor and non-transitory memory, the computer platform configured to communicate with one or more entity systems via one or more computer networks, the computer platform configured to;
parse one or more data elements of a plurality of electronic messages associated with the one or more entity systems to determine one or more destinations of the plurality of electronic messages;
detect, via the one or more data elements, that a message of the plurality of electronic messages includes: a) a request for participation in an electronic auction and b) an order of a predetermined sell order type associated with an entity having securities not previously registered for transactions with the computer platform;
verify that the detected message includes one or more predefined characteristics to form a verified order, the one or more predefined characteristics comprising at least one entity characteristic indicated in the detected message;
route, continually and in real time, the plurality of electronic messages to the one or more destinations, including routing the verified order to an order book storage structure prior to the electronic auction;
determine, at a scheduled auction time, whether sell order information in the verified order meets at least one predetermined auction condition based on an auction price; and
permit the verified order to participate in the electronic auction when the sell order information meets the at least one predetermined auction condition.

2. The system of claim 1, wherein the one or more entity systems are configured to transmit the plurality of electronic messages to the computer platform over the one or more computer networks via at least one data feed.

3. The system of claim 1, wherein the computer platform further comprises an auction engine, wherein the auction engine is configured to perform the electronic auction when the verified order is permitted to participate, to generate at least one matched order.

4. The system of claim 1, wherein the computer platform is configured to perform an allocation of the request for participation, the allocation including one or more of ranking and pricing the request for participation based on the auction price.

5. The system of claim 1, wherein the computer platform is configured to detect that the message includes the order of the predetermined sell order type based on at least one order type indication.

6. The system of claim 1, wherein the one or more predefined characteristics further comprises one or more order characteristics.

7. The system of claim 6, wherein:
the one or more order characteristics include one or more of an order type indication comprising a limit on open indication, a price indication within a price range indicated in a registration statement associated with the entity, a size indication matching a size indicated in the registration statement, and a value indication matching a value indicated in the registration statement, and the at least one entity characteristic includes a message sending indication comprising a designated broker dealer entity previously registered with the computer platform.

8. The system of claim 1, wherein the at least one predetermined auction condition includes one or more of the auction price being within a price range indicated in a registration statement associated with the entity, the verified order being present in the electronic auction and the auction price fully executing the verified order in the electronic auction.

9. The system of claim 1, wherein the electronic auction includes an opening auction for direct limit orders.

10. The system of claim 1, wherein the computer platform is configured to perform a verification of one or more message characteristics of the plurality of electronic messages.

11. The system of claim 10, wherein the verification includes one or more of a risk check evaluation, an evaluation of order type, an evaluation of one or more order characteristics and an evaluation for at least one of missing data and incorrect data.

12. The system of claim 10, wherein the computer platform is configured to generate at least one outgoing message to at least one destination entity for at least one of the plurality of electronic messages responsive to the verification.

13. The system of claim 10, wherein the computer platform is configured to route at least one of the plurality of electronic messages to the order book storage structure or an execution destination responsive to the verification.

14. The system of claim 1, wherein the computer platform is configured to store the verified order in the order book storage structure when another order of a same predetermined sell order type does not exist on the order book storage structure.

15. The system of claim 1, wherein said entity having the securities not previously registered for transactions with the computer platform includes a registration statement issued by a regulatory authority entity.

16. The system of claim 1, wherein the computer platform is configured to generate an interactive graphical user interface (GUI) comprising one or more user tools on a display of a computing device, the computer platform configured to receive user input via the one or more user tools of the interactive GUI associated with the electronic auction.

17. The system of claim 1, wherein the computer platform is configured to cancel the electronic auction when the sell order information in the verified order does not meet the at least one predetermined auction condition.

18. The system of claim 1, wherein the request for participation includes auction only order information.

19. The system of claim 1, wherein the computer platform is configured to determine the auction price for the electronic auction at the scheduled auction time.

20. The system of claim 1, wherein the computer platform is configured to parse the plurality of electronic messages to extract the one or more data elements from among one or more of a message header and a message body.

21. The system of claim 1, wherein the computer platform is configured to permit the verified order to participate in the electronic auction when the sell order information meets the at least one predetermined auction condition, such that the verified order is executed in full in the electronic auction via an auction engine of the computer platform.

* * * * *